United States Patent [19]
Lu et al.

[11] Patent Number: 5,410,475
[45] Date of Patent: Apr. 25, 1995

[54] SHORT CASE NAME GENERATING METHOD AND APPARATUS

[75] Inventors: X. Allan Lu, Centerville; Timothy M. Klein, Miamisburg, both of Ohio

[73] Assignee: Mead Data Central, Inc., Miamisburg, Ohio

[21] Appl. No.: 47,659

[22] Filed: Apr. 19, 1993

[51] Int. Cl.⁶ ..................... G06F 15/21; G06F 15/401
[52] U.S. Cl. .......................... 364/419.01; 364/419.08; 364/419.17
[58] Field of Search ...................... 364/419.01, 419.08, 364/419.10, 419.14, 419.15, 419.17

[56] References Cited

U.S. PATENT DOCUMENTS

| | | |
|---|---|---|
| 4,760,528 | 7/1988 | Levin . |
| 4,852,003 | 7/1990 | Zamora . |
| 4,965,763 | 10/1990 | Zamora . |
| 4,991,094 | 2/1991 | Fagan et al. . |
| 5,005,127 | 4/1991 | Kugimiya et al. . |
| 5,056,021 | 10/1991 | Ausborn .................. 364/419.08 |
| 5,113,342 | 5/1992 | Zamora . |
| 5,224,038 | 6/1993 | Bespalko .................. 364/419.1 |
| 5,280,573 | 1/1994 | Kuga et al. .............. 364/419.14 |
| 5,287,278 | 2/1994 | Rau .......................... 364/419.10 |

*Primary Examiner*—Robert A. Weinhardt
*Attorney, Agent, or Firm*—Popham, Haik, Schnobrich & Kaufman, Ltd.

[57] ABSTRACT

A short case name generator transforms the long case name of a lawsuit into a short case name format. The text of the long case name is converted to low-level tokens using dictionaries and heuristic rules. Selected tokens are eliminated and other selected tokens are consolidated into higher level tokens. Each of a sequence of stages receives the output tokens from the preceding stage and produce tokens at a higher level of abstraction. Ultimately, the highest level tokens are produced. Selected high-level tokens are deleted and the surviving tokens are broken down to their component tokens, selected ones of which are also deleted. Next, the surviving tokens are converted back into the text they represent. Editing rules are then applied to that text which results in the short case name format.

56 Claims, 7 Drawing Sheets

SHORT CASE NAME GENERATING METHOD AND APPARATUS

BACKGROUND OF THE INVENTION

1. Field of the Invention

This invention relates generally to computer-based methods and apparatus for processing text and, more specifically, to computer-based methods and apparatus for transforming text according to a set of heuristic rules.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but the copyright owner reserves all other copyright rights whatsoever.

2. Related Art

In the field of computerized text processing, there are numerous applications where "raw" text needs to be processed according to a set of guidelines and/or rules. One particular example of the "raw" text is the full name or the long case name (LCN) of a lawsuit. Typically, lawsuits are referred to by an abbreviated form of the LCN. This abbreviated form is referred to as the short case name (SCN).

The SCN of a lawsuit generally consists of the last names of parties who are persons and the full names (using abbreviations) of parties that are organizations. Only the first named plaintiff and defendant are listed separated by "V.", an abbreviation for versus. The general principles for proper citation rules, forms, and abbreviations useful in the creation of SCNs are contained in *A Uniform System of Citation* (14th Edition, 1986), which is hereby incorporated by reference as if fully set forth herein. This publication is commonly called the "Blue Book" and is published and distributed by the Harvard Law Review Association.

Using human editors to transform a large volume of LCNs into SCNs is time-consuming, tedious and prone to errors and inconsistency. Therefore, there is a need for a computerized system and method for transforming LCNs to SCNs.

SUMMARY OF THE INVENTION

The present invention is directed to alleviating all of the foregoing problems. The present invention provides a computerized method and apparatus that transforms a lawsuit's LCN—which is comprised of words, phrases, and punctuation—to an SCN format according to a set of rules. (1) A dictionary look-up and tokenization stage converts each word, phrase, and punctuation contained in an LCN into a low-level token (the first level of abstraction). (2) A rule-based parsing stage creates high-level tokens (higher in terms of the level of abstraction) to represent and classify selected groups of low-level tokens. (3) A culling stage uses the identities of the high-level tokens, along with the SCN creation rules, to determine which of the low-level tokens represent text that should be included in the SCN. (4) A conversion stage converts these selected low-level tokens back into the text which they represent, applying formatting, abbreviation, and acronym rules as appropriate. The resulting text is the SCN. If the software encounters unresolvable ambiguity during any of these stages, the case name is marked for later arbitration by a human editor.

BRIEF DESCRIPTION OF THE DRAWINGS

The invention is better understood by reading the following Detailed Description of the Preferred Embodiment with reference to the accompanying drawing figures, in which like reference numerals refer to like elements throughout, and in which:

FIG. 8 is a flow diagram of module stage 4 of the preferred embodiment of the present invention.

DETAILED DESCRIPTION OF THE PREFERRED EMBODIMENTS

Figure 1:
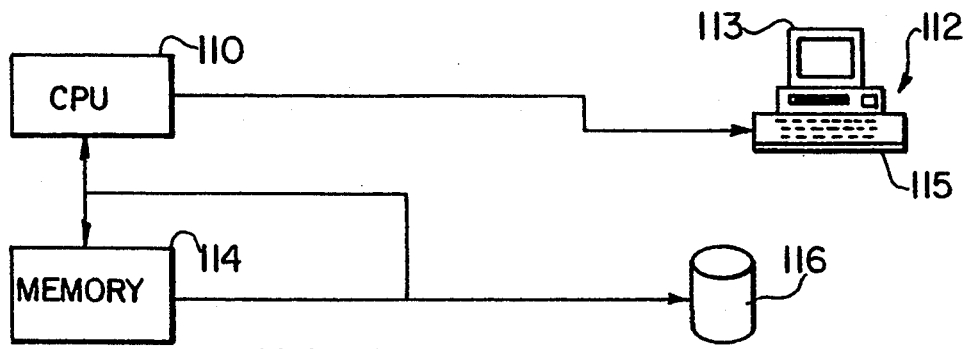
FIG. 1 illustrates a computer system employing the preferred embodiment of the present invention.

In describing preferred embodiments of the present invention illustrated in the drawings, specific terminology is employed for the sake of clarity. However, the invention is not intended to be limited to the specific terminology and the specific example so selected. It is to be understood that each specific element includes all technical equivalents which operate in a similar manner to accomplish a similar purpose. The general principles for the creation of short case names (SCNs) are contained in the Blue Book incorporated by reference above. A detailed set of editorial rules for creating SCNs was developed using the Blue Book principles as a general guide. Typically, the first named plaintiff and the first named defendant are the only two names used in the SCN. In order to know which rules should be applied to a particular party's name, two pieces of information must first be known. First, the boundaries of the party's name, i.e., where the party's name starts and ends must be determined. For example, for the LCN: "In the matter of John Smith and Mary Cox, Plaintiffs v. Procter and Gamble and Al Jones, Defendants"; it must be established that the first-listed parties on each of the opposing sides are "John Smith" and "Procter and Gamble".

The second piece of information which must be known is the type of party, i.e., whether the name represents a person, organization, inanimate object, event, or legal procedure. This must be known because different editorial rules apply to different types of parties. For example, the word "the" is retained in the SCN for "The Pacific Princess", a ship, but is omitted for "The Aspen Fish Market", an organization.

The present invention employs a bottom-up parsing approach to determine those two facts. At the bottom level is the text of an LCN. Using a large dictionary (actually two dictionaries, one for words and one for phrases) and some heuristic rules, the present invention replaces the words and phrases in that text with tokens. Heuristic rules were created based upon knowledge and experience (e.g. a word that begins with "Mc" is probably a surname). A token is an identifier which represents a classification of a word or phrase. The tokens provide a higher level of abstraction. Words that cannot otherwise be recognized are replaced with a token which indicates that the word is unknown.

At the next level, some tokens are eliminated and others are consolidated into higher-level tokens. For example, a token representing a first name and a token representing a last name could be consolidated into a token representing a person. This process results in a higher level of abstraction. The preferred embodiment of the present invention includes a sequence of software modules, each of which takes the output lists of tokens from the preceding module and produces lists of tokens at a higher level of abstraction.

Ultimately, the highest-level tokens, called "terminals" or "classifications", are produced. These tokens include such designations as person, organization, object, etc. Legal terms (such as "versus") which are to be included in the SCN are represented by terminals as well. Each terminal is accompanied by an indication of which section of the LCN's text it represents.

At this point, the two necessary pieces of information have been determined for each party, and the editorial rules can be applied. The application of these rules is accomplished through a top-down approach in the preferred embodiment of the present invention. Almost all of the rules involve deleting text from the LCN, rather than changing words. The modules which apply the rules break the highest level tokens (terminals or classifications) down into their component tokens and apply the rules by deleting the appropriate tokens. Next, the surviving tokens are converted back into the text they represent. Finally, the rules that do involve changing text are applied and the SCN is complete.

If only one SCN is created for a given LCN, then it is considered to be correct. If two or more SCNs are created for a given LCN, the multiple SCNs are sent to a human editor for resolution. Multiple SCNs can result when a word or phrase in the LCN has more than one token associated with it in the dictionary. For example, the word "Bank" is tokenized as both an organization type and a last name. Therefore, a party named "Beverly Bank" would be tokenized twice, once with the second word treated as an organization-type, and once as a last name. In the absence of any context to help rule out one of those options, this ambiguity might result in two different SCNs—one in which the editorial rules for organizations were applied, and one in which the editorial rules for persons were applied. When this happens, the LCN is considered to be ambiguous, and is sent to a human editor to be reviewed. It is also possible for an LCN to be ambiguous even if only one SCN is generated for it. This is because the stages which apply the rules contain heuristics to detect error-prone sequences of tokens or text. When such a sequence is found, an additional dummy SCN is created in order to force the LCN to have multiple SCNs and therefore to be tagged for a human editor to review.

A preferred embodiment of the present invention is implemented as a software program including a series of modules and a computer system. As shown in FIG. 1, the preferred embodiment of the system of the present invention includes a central processing unit 110. The central processing unit interacts with a human user through a user interface 112. The user interface is utilized for inputting information into the system and for interaction between the system and the human user. The user interface 112 could include, for example, a video display 113 and a keyboard 115. A computer memory 114 provides storage for data and software programs which are utilized by the central processing unit 110. Auxiliary memory 116, such as a hard disk drive or a tape drive, provides additional storage capacity and a means for retrieving large batches of information.

All of the components shown in FIG. 1 are of a type commonly known to those skilled in the art. In the preferred embodiment, the system of the present invention includes a SUN ® workstation including the execution platform Sparc2 and SUN OS Version 4.1.2. The SUN ® workstation and the execution platform Sparc2 are available from Sun Microsystems of Sunnyvale, California. However, the system of the present invention could operate with any number of modern computer systems.

Figure 2:
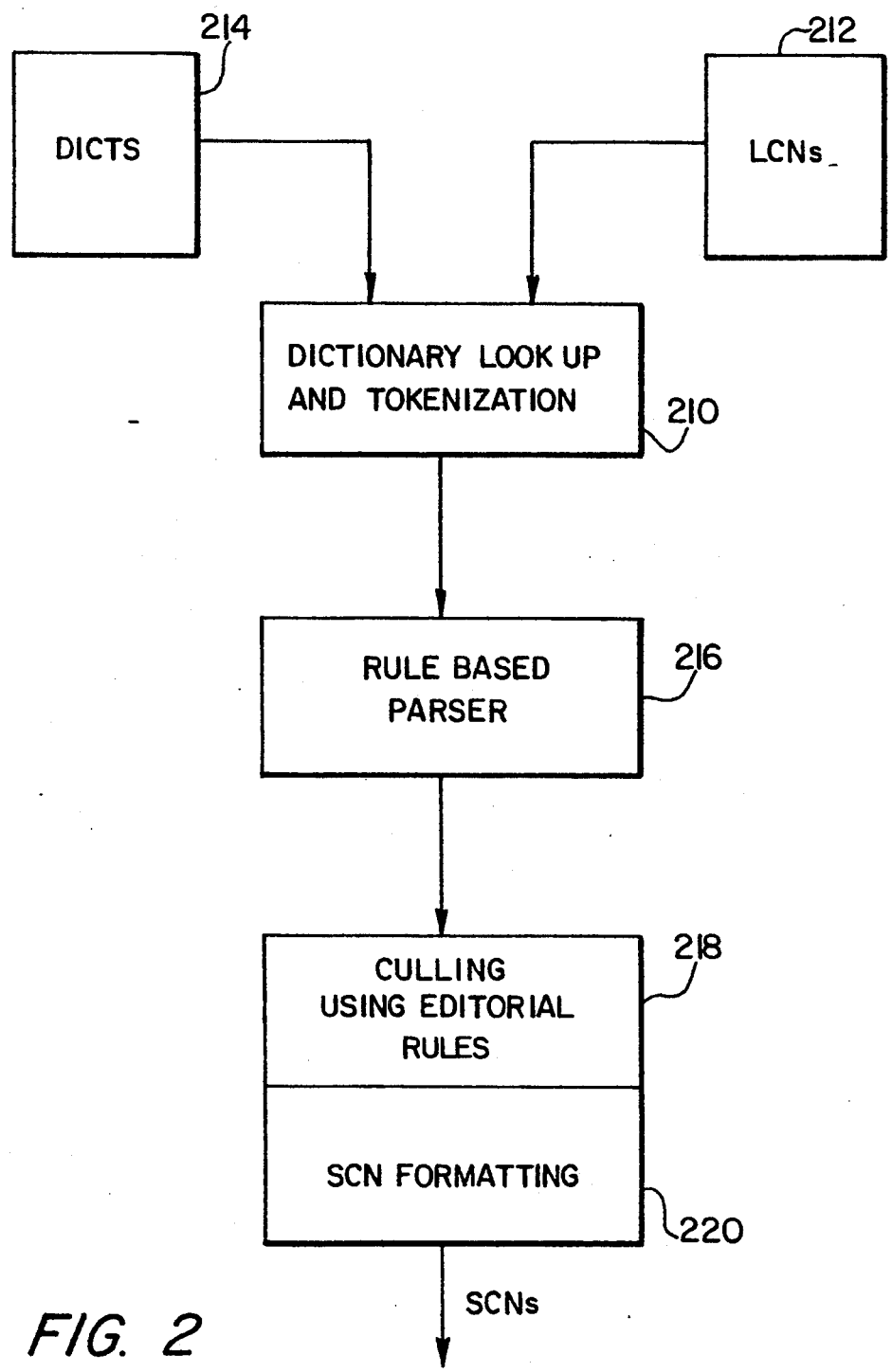
FIG. 2 a high level flow diagram of the method of the preferred embodiment.
Figure 3A:
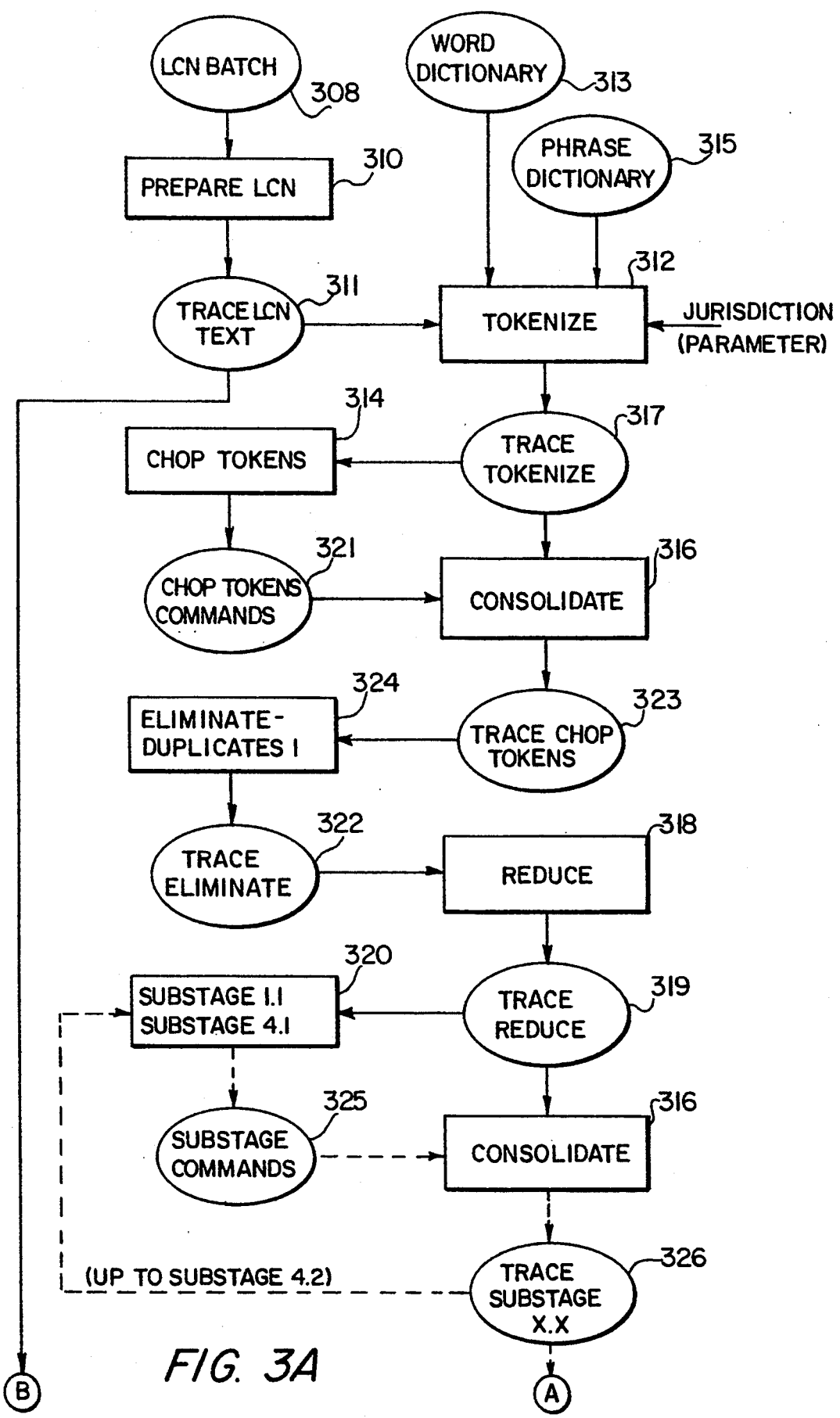
FIGS. 3A and 3B are a flow diagram showing the relationship among the modules of the preferred embodiment of the present invention.
Figure 3B:
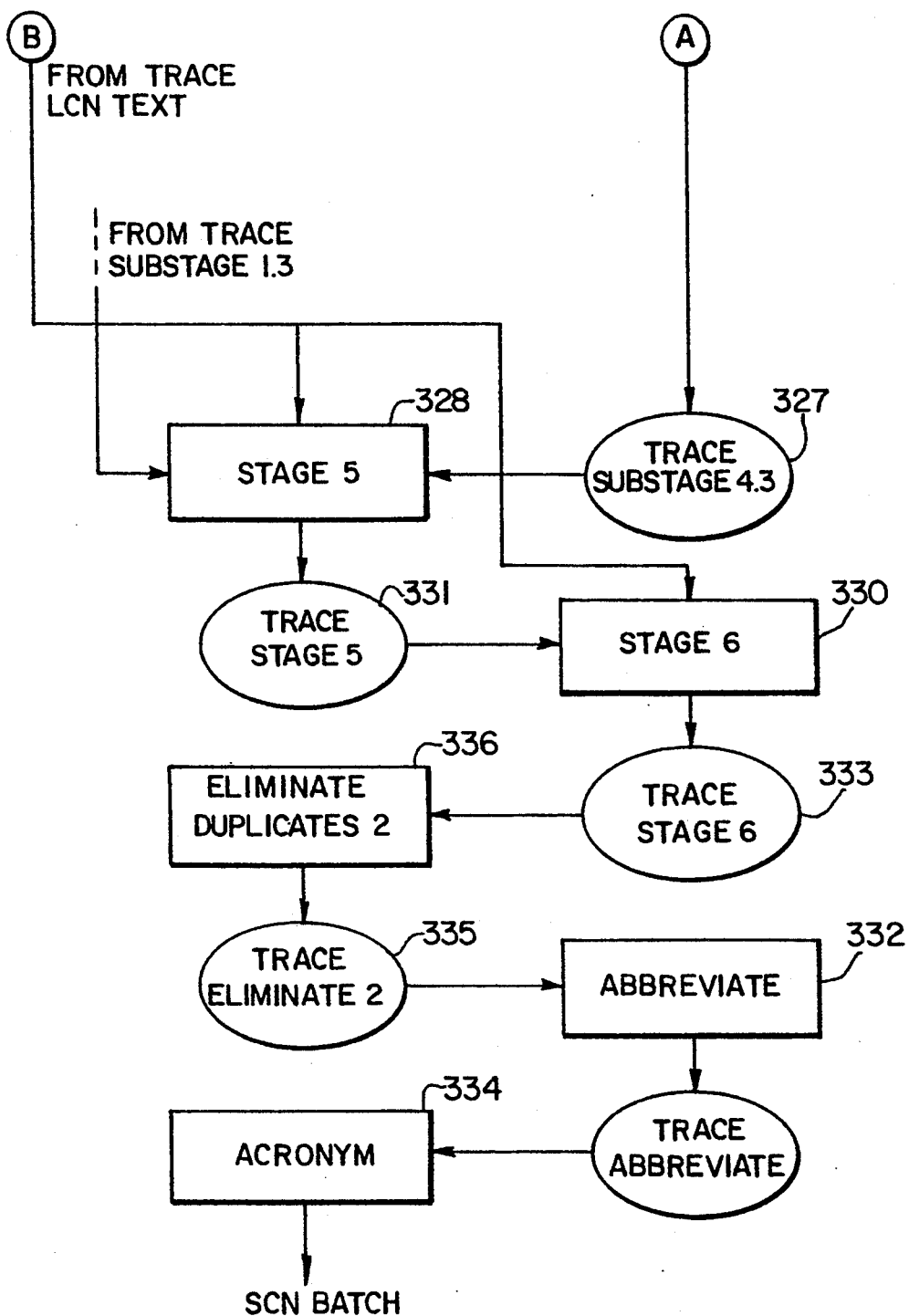

FIG. 2 provides a general overview of a preferred method of the present invention, whereas FIGS. 3A and 3B (referred to collectively as FIG. 3) show a flow diagram of the relationship among the software modules making up the preferred embodiment of the present invention. In the first portion of the process, as represented by the box labelled 310 (FIG. 3), the raw LCNs 212 are formatted for processing and then the words within those LCNs are converted to tokens through a look-up process using two dictionaries represented by the block numbered 214. One of the dictionaries is for single words and the other dictionary (if needed) is for phrases.

The next step in the process represented in FIG. 2 involves the application of a set of rules to the lists of tokens derived by stage 210. This step is represented by the block labelled 216 and is referred to as the rule-based parsing stage.

In the rule-based parsing stage 216, tokens are combined or eliminated according to a set of heuristic parsing rules (not the editorial rules). For example, the token representing a single capital letter next to the token representing a period may be combined into the token representing an initial. After all of the processing in stage 216 is completed, the highest level of abstraction in the system has been reached which is comprised of highest level tokens referred to as terminals or classifications. This information is then passed to the next stage represented by the box 218.

In the culling stage 218, the editorial or SCN creation rules are applied. Using the identities of the high-level tokens, along with heuristic rules and the SCN creation rules, the culling stage 218 determines which of the low-level tokens represent text which should be included in the SCN.

In the final stage, indicated by the box labelled 220, formatting rules are applied to the text. These include such rules as converting the text "International Business Machines" to the acronym "IBM". At the end of the stage 220, the SCNs are in their final form.

FIG. 3 is a flow diagram which indicates the general flow or sequence of execution of the software modules which are utilized in the preferred embodiment of the present invention to carry out the process discussed generally above. In the preferred embodiment of the present invention, a batch of LCNs 308 is processed at one time. The batch is input from the user interface 112 and stored in the memory 114 and/or the auxiliary memory 116 (see FIG. 1) and retrieved as needed.

In the preferred embodiment of the present invention, most of the modules are written in the C++ programming language and compiled by the AT&T C++ Compiler Version 3.0.1. The modules abbreviate, acronym and substage 1.1 through substage 4.3 are preferably written in the "flex" programming language, Version 2.3.

The module prepareLCN 310 performs certain editing or pre-processing functions on each raw LCN before it is processed further. The prepareLCN module 310 shortens each LCN to the maximum allowed length by chopping off characters at the end. This is done for the sake of efficient processing, though it does introduce the calculated risk that the truncation may result in an incorrect SCN. The module prepareLCN 310 also strips away non-text information such as format indicators (end of line indicators, etc.) contained in the LCN which are not needed for processing. The output of this module is a file referred to as Trace.LCNtext 311 of prepared LCNs, one prepared LCN per line.

The file of prepared LCNs 311 is then passed to the module tokenize 312. In general, the module tokenize 312 converts all of the words, punctuation and phrases in the prepared LCNs to tokens. The words, punctuation and phrases are converted to tokens by searching the word dictionary 313 and the phrase dictionary 315 for each word, punctuation and phrase contained in each LCN. When a match occurs, the matching word, punctuation or phrase is then replaced with the corresponding token. The module tokenize 312 also applies a set of heuristic rules for identifying words that do not appear in the dictionaries and another set of heuristic rules for eliminating unreasonable or unlikely tokenizations. If a word cannot be converted to a token by any of the foregoing methods, it is given an XXXXXX token, meaning "unknown".

For example, the LCN:

```
12345678 Robert McCan, Plaintiff vs. XYZ Co.,
  Defendant
``` would be converted to the following output:

```
12345678.001 FRSTNM XXXXXX PNCCMA
  CROLES VERSUS XXXXXX ORGTYP
  PNCCMA CROLES 0 6 8 12 13 13 15 23 25 27 29 31 33 35 36 36 38 46.
```

The eight-digit number preceding the LCN is its unique identifier. This number is repeated in the first line of the output (referred to as the "token line"), followed by a three-digit SCN number. The six-letter tokens represent words and punctuation in the LCN. "Robert" is represented by the token FRSTNM (first name), "McCan" by XXXXXX (unknown), the comma by PNCCMA (punctuation-comma), "Plaintiff" by CROLES (case role, singular), "vs." by VERSUS (versus), "XYZ" by XXXXXX (unknown), "Co." by ORGTYP (organization type), "," by PNCCMA and "Defendant" by CROLES.

For every token, there are two corresponding numbers in the line that follows, referred to as the "address line". Those two numbers are the starting and ending offsets into the text of the LCN for their respective token. The address line is used to maintain the correlation between the text of the LCN and the tokens. For example, the FRSTNM token represents the characters from position 0 to position 6 in the LCN (this is the word "Robert"), the XXXXXX token represents the characters in positions 8 through 12 ("McCan"), the token PNCCMA represents the character in position 13 (","), the token CROLES represents the characters in positions 15 through 23 ("Plaintiff"), the token VERSUS represents the characters in positions 25 through 27 ("vs."), the token XXXXXX represents the characters in positions 29 through 31 ("XYZ"), the token ORGTYP represents the characters in positions 33 through 35 ("Co."), the token PNCCMA represents the character in position 36 (",") and the token CROLES represents the characters in positions 38 through 46 ("Defendant").

Figure 4:
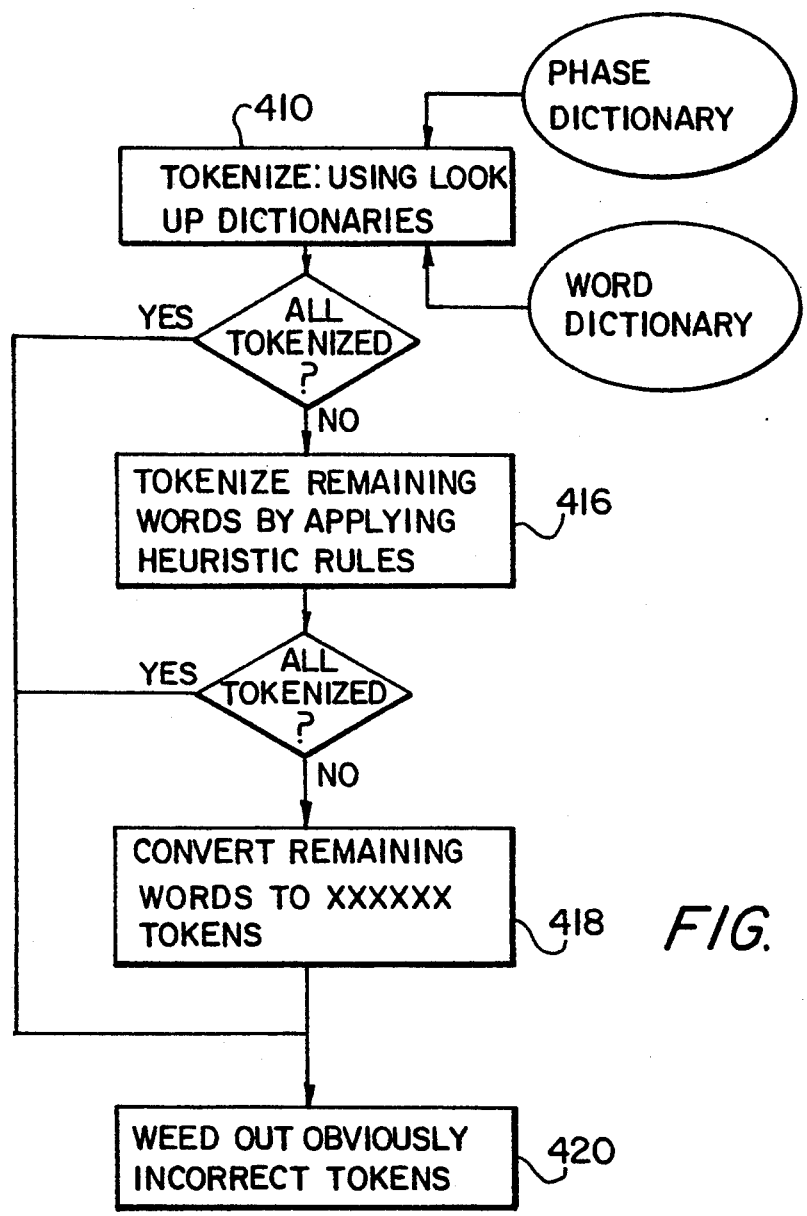
FIG. 4 is a flow diagram of module tokenize of the preferred embodiment of the present invention.

The module tokenize 312 uses three methods, as shown in FIG. 4, to tokenize the text of an LCN. First, a dictionary look-up method represented by box 410 is used. The two dictionaries, word dictionary 313 and phrase dictionary 315, are searched for tokens which correspond to a word or groups of words in the LCN.

The following is a list of representative tokens which are particularly useful in the specific example of transforming an LCN of a lawsuit to an SCN.

Individual Person

FRSTNM: common American first name.
FRGNNM: foreign name, including Indian name (e.g., "Perez", "Santos").
LASTNM: ambiguous word that could either be a last name or something else (e.g., "bank", "cable", "husband").
MLTWNM: multi-word name component (e.g., "le", "la").
NATVNM: Native American name.
ORNTNM: Oriental name.
PSNDES: person descriptor (e.g., "child", "uncle", "youth", "minor")
PSNSFX: person's suffix (e.g., "Jr.") .
PSNTTL: person's title (e.g., "Mr.", "Ms.") .
SPPGNM: Spanish or Portuguese name.

Organization

AGENCY: governmental or private institute (e.g., "Center").
CARWRD: car word (e.g., "FORD", "TOYOTA")
COURTT: legal court (e.g., "appellate") .
CTRYNM: country name (e.g., "Canada") .
JRSLOC: local jurisdiction (e.g., "city", "county") .
JRSSTA: individual state (e.g., "state", "people").
ORGACR: organization acronym.
ORGDES: organization descriptor (e.g., "non-profit").
ORGOFF: government officer (e.g., "sheriff").
ORGSFX: organization suffix (e.g., "Inc.") .
ORGTYP: organization type (e.g., "corporation", "university", "association").
ORGWRD: organization word in organization names (e.g., "leasing", "pizza") .
STATNM: state name (e.g., "Ohio", "OH").
UNNWRD: union word (e.g., "chapter", "lodge").

Object

BOATNM: boat name component (e.g., "S.S.", "U.S.S.").
BOATTP: boat type (e.g., "schooner", "carrier") ,
BOATPT: boat part (e.g., "cargo", "engine", "hull", "tackle").

CONTNR: container (e.g., "package", "barrel", "box").
ITMWRD: item word (e.g., "currency", "dollar", "jewelry") .
OBJDES: object descriptor (e.g., "serial no", "more or less").
OBJIND: object indicator (e.g., "apartment").
STRTTP: street type (e.g., "street", "lane").
VHCLTP: vehicle type (e.g., "sedan", "bus").

Function Words

Grammatical Function word
ADVERB: adverb (e.g., "individually").
ARTICL: article (e.g., "a", "an") .
CONCTR: conjunction (e.g., "and", "or") which connects words within a party (see SEPRTR).
CRDNUM: cardinal number (e.g., "two", "thousand") .
DTMNER: determiner (e.g., "the", "that").
LOCWRD: location word.
ORDNUM: ordinal number (e.g., "first", "second").
OTHPRN: other pronoun or non-personal pronoun (e.g., "it", "what").
PRPSOF: preposition "of".
PRPSTN: preposition (e.g., "in", "from").
PSNPRN: personal pronoun (e.g., "his", "they", "their").
SEPRTR: conjunction (e.g., "and", "or") which separates two parties.

Participle
OBJPPL: participle indicating an object (e.g., "situated").
ORGPPL: participle indicating an organization (e.g., "self-insured").
PRTCPL: participle (e.g., "called", "known").
PSNPPL: participle indicating a person (e.g., "married").

Case Name Function Word
CROLEA: role adjunct (e.g., "cross", "third-party").
CROLES: case role, singular (e.g., "appellant", "defendant").
CROLEP: case role, plural (e.g., "plaintiffs", "defendants").
DLMTER : delimiter (e.g., "et al.", "etc.").
STKPHR : stock phrase (e.g., "grand jury proceedings").
VERSUS : a legal term (e.g., "v." or "vs.") that divides a long case name into the left side and the right side.
WRITSW : writs (e.g., "habeas corpus").
XXXXXX : an unknown word.

Punctuation
PNCAPP: punctuation "'".
PNCAST: punctuation "*".
PNCBAC: punctuation "\".
PNCCMA: punctuation ",".
PNCCOL: punctuation ":".
PNCDOL: punctuation "$".
PNCDOT: punctuation ".".
PNCUND: punctuation "_".
PNCDSH: punctuation "-".
PNCEXC: punctuation "!".
PNCHYP: punctuation "-".
PNCLEF: punctuation "(", "[", "{".
PNCPCT: punctuation "%".
PNCPND: punctuation "#".
PNCQUE: punctuation "?".
PNCQUO: punctuation """.
PNCRIG: punctuation ")", "]", "}".
PNCSEM: punctuation ";".
PNCSLA: punctuation "/".

Number and Measure Word
DIGITS: digits (e.g., "2", "1989").
RMNNUM: Roman numeral (e.g., "II", "XII").

Case Name Procedural Phrases
PPINRE: procedural phrase "in re"
PPXREL: procedural phrase "ex rel"
PPXPRT: procedural phrase "ex parte"
PPPROC: other procedural phrase (e.g., "matter of", "application of").
PROBAT: probate term (e.g. "estate", "heirs", "trust", "will").

Other Notation
CPTLT?: capital letter -with the "?" replaced with a letter (e.g., "CPTLTA").
STPWRD: stop word (e.g. foreign word).

Parsing Notations
PSNPTY: person party.
ORGPTY: organization party.
UNNIND: union indicator.
OBJPTY: object party.
OBJWRD: object word.
INITAL: a capital letter (V is excluded here) plus the punctuation ".".
INITLV: the capital letter V plus the punctuation ".".
CSROLE: case role.
OFPHRS: "of" preposition phrase.
PPPHRS: other preposition phrase.
ALLDES: general descriptor.
CSEEND: indicator of the ending of first case name.

Terminal States
PERSON
ORGZTN: an organization.
ASTATE: a single state.
OBJECT
UNKNWN: unknown party type.
STPWRD: indicates need for attention of human editor.
PPINRE, PPXREL, PPXPRT After the dictionary look-up method is applied, heuristic rules are applied as represented by box 416. If a word has no dictionary entry, a variety of heuristic rules are used in an attempt to tokenize the word. Specifically, a word containing an imbedded "&" is tokenized as ORGWRD (organization word), e.g., AT&T.

Any word starting with "O'" or "Mc" or "Mac" followed by a capital letter is tokenized as a last name.

A word consisting entirely of numbers is tokenized as a digit string.

A word consisting entirely of capital consonants is tokenized as an organization word because it is probably an acronym.

A word which begins with a prefix "Akti-" or "Dampskib-" is tokenized as an organization word.

Words which end with the suffixes "-icians", "-ists", or "-logies", for example, are tokenized as organization words, unless the word has already been tokenized as something else.

Words beginning or ending with a certain combination of letters can be tokenized as first or last names and/or oriental names and/or foreign names unless the word has already been tokenized as something else. For example, words ending in "-son", "-baum", "-berger" or "-witz" are categorized as last names.

Any word that cannot be tokenized by one of the previous two methods is assigned an XXXXXX (unknown) token in the step represented by box 418.

A single word or phrase may have more than one token associated with it in the dictionaries. For example, the word "bank" has two tokens: LASTNM (last name) and ORGTYP (organization type). A word that has two or more such interpretations is called "ambiguous". When an ambiguous word appears in an LCN, the tokenize module generates one token line for each possible interpretation of that word. So for the LCN "Beverly Bank vs. John Doe" two token lines would be generated:

```
12345678.001 FRSTNM LASTNM VERSUS
             FRSTNM XXXXXX 12345678.002 FRSTNM ORGTYP VERSUS
             FRSTNM XXXXXX
```

(Each token line would also have an address line after it.)

If a second word in an LCN was ambiguous, with two different tokens in its dictionary entry, there would be 2×2=4 token lines generated for this LCN. For a large LCN with many potentially ambiguous words, combinatorial explosion must be avoided. Therefore, in the preferred embodiment of the present invention, the tokenize module 312 is limited to 64 permissible combinations of tokens for each LCN and any further combinations are ignored. Of course, the cut-off number for combinations could be lower or higher. An excessively high cut-off could lead to a bottleneck in the processing as the module works its way through hundreds of possible combinations.

Since the words near the beginning of an LCN are usually the important ones for purposes of SCN generation, the ambiguities in an LCN are iterated left-to-right. That is, the closer to the beginning of the LCN a word or phrase occurs, the more likely that all of its possible interpretations will be included in the 64 token lines created.

Once token lines are created, there may be some which are obviously incorrect. For example, in the preferred embodiment of the present invention, it would make no sense for VERSUS to be the first or last token in the line in the context of the name or caption of a lawsuit. Therefore, after all the words and phrases in an LCN have been tokenized, a sequence of heuristic rules is used to "weed out" the token lines that are not likely to be correct in the context of the LCN as represented by box 420. This weeding out leaves more room under the 64 line limit for token lines that are more likely to be correct.

More specifically, token lists which violate the following rules are weeded out.

Neither the first nor the last word in an LCN can be "versus".

"Comm." cannot be an abbreviation for "Commonwealth" unless it is followed by "of" followed by the name of one of the four states that call themselves Commonwealths.

A term cannot be a first name if it is preceded by "of" preceded by a jurisdiction token (this rule keeps the words Virginia, Florida, Georgia, Alabama, California, Texas and Washington from being unnecessarily ambiguous).

"And" cannot be a connector token a) if it is preceded by "company", "corporation", "incorporated" or "United States";
b) or if it is followed by "their" or "United States";
c) or if it is followed by a person-title but not preceded by one;
d) or if the next word is unambiguously a delimiter;
e) or if it is preceded by a location word token;
f) or if it is preceded by an ORGACR (organization acronym);
g) or if the multi-letter word preceding it is in all uppercase letters but the multi-letter word following it is not.

"And" cannot be tokenized as a separator word a) if the words on both sides are case roles (i.e., "plaintiff", "defendant", "appellee", "appellant", etc. );
b) or if the words on both sides are ordinal numbers (e.g., "first");
c) or if the words on both sides are cardinal numbers;
d) or if the words on both sides are adverbs or prepositions;
e) or the words on both sides are tokenized as words that go together like "bank" and "trust";
f) or if the next word is "company", "sales", "supply", "service", "equipment", or "vicinity";
g) or the words on either side end with organization-word suffixes;
h) or if the words on either side are ex rel equivalents;
i) or if it is the second word after a procedural phrase or "versus" or the beginning of the LCN, and neither of the adjacent words is a first name or a jurisdiction or a state name.

The single lower case letter "v" cannot be anything but VERSUS.

Uppercase "V" (possibly followed by a period) must mean VERSUS if it immediately precedes "the" or if it immediately precedes or follows "United States" or a jurisdiction or an unambiguous name of a state.

"A" or "a" cannot be an article if followed by a period or if surrounded by other stand-alone capital letters.

A term probably is not a person's name if it is followed by "of".

A word that starts with a lowercase letter probably isn't a proper noun.

With regard to the word "de" the following rules apply. If it is the last word in a party name, it is probably not a multi-word name indicator. "De" probably does not indicate "Delaware". "DE" in any capitalization scheme probably does not mean "Delaware" if it is preceded by a first name or a Spanish or Portuguese name or a capital letter or an initial.

If an ambiguous term consists of two single letters separated by periods (for example, S.A.), and if it is not part of a larger sequence of single letters, then it is not an organization suffix if it is followed by an unambiguous last name or if it is the first term of the case name or the first term after "the" or "versus" or a procedural phrase. It is not initials if it is preceded by a term associated with organizations (possibly with a "," in between), or by the word "the".

An ambiguous term cannot be a last name if it can also be an organization type and it is followed by an unambiguous organization suffix (possibly with a "," in between)

If an ambiguous term can be a brand of car and also a person's name (for example, "Ford"), and if an adjacent word is a vehicle-type or another brand of car, then rule out the possibility that the ambiguous term is a person's name.

If an ambiguous term can be both an Oriental name and a first name, or both an Oriental name and a last name, and if there is a capital letter or initial after it or another first name or last name on either side of it, then rule out the possibility that the ambiguous term is an Oriental name.

If an ambiguous term can be a probate term ("will", "trust", "estate", etc.) and it is followed by a preposition, then rule out any other possible tokenization of the term. On the other hand, if it is followed by an organization type, then it must not be a probate term after all.

If an ambiguous term can be a probate term and the term preceding it is possessive, then the preceding term must be a last name, and this term must be a probate term.

"Construction" cannot be a legal procedure unless it is followed by the word "of" followed by "the" or a probate term. However, if those conditions are met, then the ambiguous word cannot be an organization word.

The ambiguous word cannot be a procedure (for example, "administration") unless it is followed by a preposition or colon (":") or ends with "-ing", or is preceded by a possessive word.

An ambiguous term cannot be a role-adjunct unless it is followed by a hyphen ("-") or a role-word.

"Against" must be a VERSUS if it is preceded by a ".", "—", ",", or an unambiguous role-word. However, "against" must be a preposition if it is preceded by a procedural phrase that ends with a word such as "proceedings" or "actions".

I f the ambiguous term appears to be a Social Security Number, change its token representation to PSNSFX (person suffix).

"Sons" cannot be a person suffix if it is the first term after a VERSUS or the beginning of the LCN, or if it is preceded by a possessive word. (Note that "& Sons" is tokenized as a single term so it does not enter into this rule).

An ambiguous term cannot be a street-type if it is the first word after a VERSUS or the beginning of the LCN.

If an ambiguous term is "debtor", "bankrupt", or "bankruptcy" and the case name starts with the token PPINRE (the procedural phrase "in re"), and the next token is not VERSUS, then mark this ambiguous term as the end of the case name.

"Bell" or "King" probably is not an organization word if it is preceded by a first name. (A later rule comes to the same conclusion if either of these words is preceded by an initial and a first name.)

An ambiguous term cannot be a NUMIND (number indicator, i.e., # or no.) unless it is followed by a cardinal number or "-" or "-" or a word containing a digit.

"Division" (or "Div." or "Div") probably is not an organization word if it is preceded by a ", ", else it probably is not an organization descriptor. If it is not followed by a number or preceded by an ordinal number, it probably is not a labor union word.

The word "et" should not be tokenized as a stop-word if it is the last term in the LCN, or if it is followed by a ",", a ";", a VERSUS, or a delimiter.

"IN" with that exact capitalization scheme, probably is not an abbreviation for Indiana if it is preceded by a location word or digits or the word "dollars".

"Acres" must be a location word if it is preceded by digits or a cardinal number.

"Late" cannot be a delimiter if it is not preceded by a ",".

"Dean" cannot be an officer word unless it is followed by "of". However, if it is followed by "of", then it cannot be a first name.

"Trading" cannot be an organization type if it is not capitalized. It also cannot be a delimiter if it is not followed by a preposition, or a connector followed by another delimiter.

"Board", "Center", "Service", or "Works" cannot be a last name if it is the first word of a party, or if one of its two preceding words is a word associated with organizations.

If a term is an ambiguous last name (such as "Branch" or "Mills"), check to see if it is preceded by an unambiguous initial preceded by a first name. If so, force it to be a last name.

An ambiguous term cannot be a writ-word unless it is "writ of" or "writs of", or if those words immediately precede it, or if it is preceded by the word "and" preceded by another writ-word.

"In the interest of" cannot mean "ex rel." if these are the first words in the case name.

If this LCN came from a military court, then "private" and "sergeant" must be person descriptors.

After the module tokenize 312 has completed its operation, the token lines and address lines are placed in the file Trace.tokenize 317 and are also passed to the module chopTokens 314. The module chopTokens 314 reads a token line and deletes any tokens which are irrelevant to the creation of the SCN. This process is performed in order to make the parsing task which takes place in the stage modules discussed below, simpler and faster. Also, if multiple token lists for the same LCN are rendered identical by this module's "chopping", then the duplicate strings are eliminated.

Specifically, the following tokens are chopped: any tokens after the first sequence of role-tokens (CROLES, CROLEP, and CROLEA) after the first VERSUS; the first semi-colon after the first VERSUS, and all tokens following it; and the second VERSUS token and all tokens following it. However, the module chopTokens 314 does not actually delete the tokens. Rather, the module chopTokens 314 creates a "command line"for each token line in which deletions are needed. A command line is similar to a token line, but with "c" and "d" commands interspersed among the tokens. A file of command lines called chopTokens.commands 321 is then passed to the module consolidate 316 along with the file of token lines and address lines Trace.tokenize 317. Chopped tokens are replaced with a "d" command so that the output of this module can be processed by the consolidate module 316 discussed below.

The module consolidate 316 performs the "c" (combine) and "d" (delete) commands produced by the module chopTokens 314 and the modules stage 1 through stage 4 discussed below. The module consolidate 316 reads a line of tokens and its associated line of address pairs from an input file (Trace.tokenize 317) and a corresponding command line from another input file (chopTokens.commands 321).

A command consists of a number followed by a "c" or a "d". A "c" preceded by a number (call it "n") and followed by a token (call it "T") , is an instruction to combine the next n tokens into a single token T. In this way, several tokens can be combined to form one higher level token. When this happens, the address pairs of all of the lower level tokens are consolidated into a single address pair for the higher level token.

A "d" command preceded by a number "n" is an instruction to delete the next n tokens. When this happens, those tokens' address pairs are deleted as well.

The commands in the command line are performed upon the tokens in the token line, and the address line is modified to reflect those actions and thereby maintain the correspondence between the tokens and the LCN. The modified token line and address line are written to the output file Trace.chopTokens 323. An example is shown below.

EXAMPLE

Token Line: 12345678.001 FRSTNM LASTNM PSNSFX PNCCMA DLMTER 0 4 6 12 26 30 32 32 34 36

Command Line: 12345678.001 2c PSNPTY PSNFSX 1d DLMTER

Output: 12345678.001 PSNPTY PSNFSX DLMTER 0 12 26 30 34 36

In the example above, the token FRSTNM (first name) and the token LASTNM (last name) have been combined into the higher level token PSNPTY (person party). Additionally, the token PNCCMA (punctuation-comma) has been deleted. Note that the address line has also been modified accordingly.

Identical token lists for the same LCN are eliminated as represented by box 324.

The output from the consolidate module 316 with identical token lists removed is then passed on to the module reduce 318. The module reduce 318 eliminates token lines from a single LCN in excess of a specified maximum number. This is done to reduce the number of lines which need to be processed. The maximum number of lines is selected by weighing the desire for quick processing against the desire for reviewing all possible SCNs. The output from the module reduce 318 is then passed to a series of parsing stages.

The parsing stages or the parser, shown generally as box 320, is contained in a series of modules referred to as stages. The parser includes stages 1 through 4. Each parsing stage in turn consists of a number of parsing routines referred to as substages (e.g., stage 1 includes substages 1.1 through 1.8). The parser performs parsing on the token lists or strings generated by the preceding modules.

Each substage 1.1 through 4.3 outputs a command file stagex.x.commands 325 ("x.x" represents the last executed stage) which is passed to the module consolidate 316 at the end of the execution of the substage. The module consolidate 316 then performs the consolidations or deletions for each substage. In other words, after each substage is executed, the module consolidate 316 is executed.

The module consolidate 316 then outputs a file Trace.stagex.x 326 where "x.x" represents the particular substage that was last executed. The output file 326 is passed on to the next substage to be executed. Finally, substage 4.3 is executed, the module consolidate receives stage4.3.commands and outputs Trace. stage4.3, represented by icon 327 (represented generically as 326), which is passed on to stage 5 represented by box 328. Stage 1 attempts to understand the structure of a given LCN. The structure of an LCN falls into one of two categories or types. An LCN may have multiple legal actions or suits and each suit may contain procedural phrases (e.g., "in re"), parties (e.g., "John Smith, a retiree"), case roles (e.g., "appellant") , and/or the divider (i.e., "v."). LCN type 1 has the following structure:

Procedural-phrase* (party procedural-phrase?)+- case-role-role?
[Divider?
Procedural-phrase, (party procedural-phrase?)+- case-role-role?]*

The notation "*" indicates zero or more occurrences of the preceding element, "+" indicates one or more occurrence of the preceding element, and "?" indicates zero or one occurrence of the preceding element. "Procedural-phrase" includes PROBAT, PPINRE, PPXPRT and PPXREL, "party" consists of "party-name" and its "relator" and/or description, "party-name" includes ASTATE, OBJECT, ORGZTN, PERSON, STKPHR, STPWRD, and UNKNWN. "Relator" includes OBJECT, ORGZTN and PERSON, "description" includes ALLDES, OBJDES, ORGDES, PSNDES and PSNSFX, "case-role" includes CROLES and CROLEP, and "divider" includes VERSUS. The following are three examples of LCN type 1 (Note that words are used instead of tokens in the examples for the sake of readability. The parser is in fact dealing with tokens. ):

1. Urban Electrical Company, Inc., Plaintiff, v. Cable Index, Defendant, v. Conductors Latincasa S. A. de C. V., Third-Party Defendant.
2. In the matter of Federated Department Stores Inc., et al., Debtors; B. Brothers Realty Limited Partnership, Movant v. Federated Department Stores, et al., Respondents.
3. In re the Will of J. C. Smith.

The second type of LCN structure, LCN type 2, is set forth below using the same notation as was described above.

[Procedural-phrase* (party procedural-phrase?)+- case-role-role?
Divider?
Procedural-phrase* (party procedural-phrase?)+- case-role-role?]+

Set forth below are three examples of LCN type 2:

4. Francis X. Bellotti, as he is Attorney General of the Commonwealth of Massachusetts, Plaintiff v. Telco Communications, Inc. and Donald Quatrucci, Defendants; Telco Communications, Inc., Plaintiff, v. Francis X. Bellotti, as he is Attorney General of the Commonwealth of Massachusetts, Defendant.
5. In re WJM, Inc.; In re Rockview Inc.; In re Walter M., Inc.; In re Senior Care Associates, Inc.; WJM, Inc., Rockview Inc., Walter M., Inc., Senior Care Associates, Inc., Plaintiffs v. Commonwealth of Massachusetts.
6. J. C. Smith v. A&P.

Stage 1 omits all suits except the first suit listed in an LCN in which two or more suits have been consolidated into one case. As a result, stage 1 transforms the above two general LCN structures into either LCN type 3 or LCN type 4. Descriptions of LCN type 3 and LCN type 4 are set forth below using the notation previously described.

LCN type 3: Procedural-phrase* (party procedural-phrase-phrase?]+case-role?
Divider?
Procedural-phrase* (party procedural-phrase?)+- case-role?

LCN type 4: Procedural-phrase* (party procedural-phrase?) +case-role?

After the transformation of stage 1 has been performed, the six examples set forth above would look like the following:

1. Urban Electrical Company Inc. Plaintiff v. Cable Index, Defendant.
2. In the matter of Federated Department Stores, Inc., et al., Debtors.
3. In re the Will of J. C. Smith.
4. Francis X. Bellotti, as he is Attorney General of the Commonwealth of Massachusetts, Plaintiff, v. Telco Communications, Inc. and Donald Quatrucci, Defendants.
5. In re WJM, Inc.
6. J. C. Smith v. A&P.

Substages 1.5 through 1.8 carry out the above transformation through a series of token deletions. However, in order to perform this transformation stage 1 needs certain information about the structure of the LCN including punctuation and their functions, the case roles and their positions, the divider(s) and its position, and the procedural phrases and their boundaries. Substages 1.1 through 1.4 acquire that information through token pattern identification and abstraction. For example, the token patterns CPTLTM PNCDOT and PSNTTL PNCDOT are identified as the initial pattern and the personal title pattern, respectively, and thus are consolidated into the token INITAL and PSNTTL respectively.

In addition, substages 1.1 through 1.4 consolidate repeated tokens and some tokens connected by the conjunction "and", which is represented by two different tokens, CONCTR and SEPRTR. The operations of the substages of stage 1 are discussed below in more detail.

Figure 5:
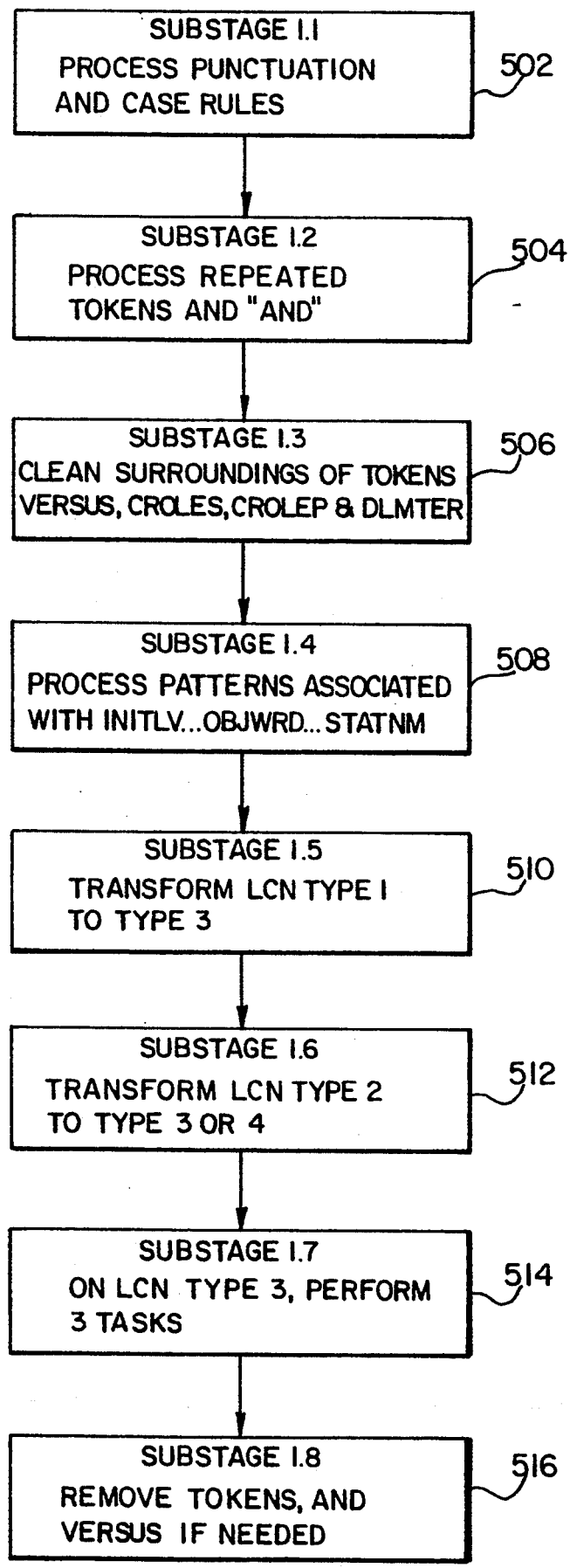
FIG. 5 is a flow diagram of module stage 1 of the preferred embodiment of the present invention.

The modules substage 1.1 through substage 1.8, shown in FIG. 5, perform several consolidation steps, including locating initials, merging repeated tokens, merging redundant LCN structural tokens, and chopping useless tokens. After each module of substages 1.1 through 1.8 is completed, the token line and the command line are passed to module consolidate 316 which then performs the deletions and consolidations as described above.

Module substage 1.1, shown as box 502 in FIG. 5, performs pattern recognition and consolidation for the patterns associated with various punctuation and the case roles (e.g., plaintiff). Specifically, substage 1.1 processes patterns associated with the punctuation period, hyphen, dash, and comma, the underscore, and patterns associated with case roles.

Substage 1.1 first processes patterns associated with the period (PNCDOT). The token list CPTLTV PNCDOT representing "V." is transformed into INITLV, an ambiguous token which can be either an initial or the divider VERSUS. The token list CPTLT? PNCDOT is consolidated into the token INITAL, where "?" represents a capital letter except V. The token list RMNNUM PNCDOT (e.g., "III") is transformed into RMNNUM.

Substage 1.1 consolidates a group of tokens into the token DIGITS, if the group of tokens consists of one or more occurrences of the token list DIGITS PNCCMA, one DIGITS, and optionally the token list PNCDOT DIGITS. For example, a token list DIGITS PNCCMA DIGITS PNCCMA DIGITS PNCDOT DIGITS representing "1,000,000.00" becomes DIGITS. Finally, the token list PSNTTL PNCDOT (e.g., "Prof.") is transformed into PSNTTL Next, the patterns associated with the hyphen (PNCHYP) are processed. A token list which consists of three tokens with the second token a hyphen (PNCHYP) is consolidated into the third token. For example, the token list STATKY PNCHYP XXXXXX representing "Kentucky-West" becomes XXXXXX.

Substage 1.1 then processes patterns associated with the dash (PNCDSH). The dash is different from the hyphen in that the dash has one space before and one space after it. A dash usually leads a descriptive phrase in an LCN. When the "A" (CPTLTA) is preceded by a dash (e.g., PNCDSH CPTLTA) it is consolidated into the token for an article, ARTICL. It is worth noting that the words "a" and "an" are treated differently from the word "the". The two words "a" and "an" are tokenized as ARTICL while the word "the" is tokenized as DTMNER (determiner). All other occurrences of a dash are simply deleted.

Next, substage 1.1 processes patterns associated with the comma. Three patterns of commas and "A" are recognized and processed First, the pattern ",A." which would be represented by the tokens PNCCMA CPTLTA PNCDOT, is consolidated into the token INITAL (initial). The pattern PNCCMA CPTLTA is changed to the token list PNCCMA ARTICL. The pattern ARTICL PNCCMA is changed to the token list CPTLTA PNCCMA.

The patterns associated with the underscore are processed next. A number of state courts use a capital letter and a sequence of underscore characters to indicate an initial. Therefore, the pattern of a capital letter followed by one or more underscores is consolidated into the token INITAL (initial).

In the last section of substage 1.1, certain patterns associated with case roles are processed. When the tokens CSROLE, CROLES, and CROLEP occur before or after PNCCMA, PNCHYP, PNCSLA, CONCTR, or SEPRTR, the two tokens are consolidated into the single token CSROLE, CROLES, and CROLEP respectively.

The module substage 1.2, represented by box 504 in FIG. 5, is executed after completion of the module substage 1.1. Recall that at the end of the execution of each stage or substage, the module consolidate 316 is executed to perform any requested consolidations or deletions.

Substage 1.2 processes the patterns associated with commonly repeated tokens and with the word "and". The commonly repeated tokens are ADVERB, AGENCY, BOATNM, BOATPT, BOATTP, CARWRD, CONTNR, COURTT, CPTLTA to CPTLTZ, CRDNUM, CTRYNM, DIGITS, DLMTER, JRSLOC, JURSTA, LOCWRD, MLTWNM, OBJDES, OBJWRD, ORDNUM, ORGDES, ORGOFF, ORGSFS, ORGSFW, ORGWRD, OTHPRN, PRPSTN, PSNDES, PSNPRN, PSNSFX, PSNTTL, RMNNUM, STATNM, STPWRD, STRTTP, UNNWRD, VHCLTP and WRITSW. Repeated tokens and repeated tokens separated by commas are consolidated (e.g., ORGWRD ORGWRD for "Correctional Facility" becomes ORGWRD, or the token list CARWRD PNCCMA CARWRD for "Pontiac, Toyota" becomes CARWRD). Also, Repeated tokens separated by the token CONCTR or SEPRTR are consolidated into one occurrence of the repeated token (e.g., token list CROLES SEPRTR CROLES for "Appellant and Defendant" is consolidated into CROLES, or the token list PSNTTL CONCTR PSNTTL for "President and CEO" becomes PSNTTL).

Substage 1.2 also processes the following patterns. The token CONCTR is transformed to the token SEPRTR when it is preceded by the token DTMNER. The token SEPRTR in the token list PPINRE CPTLT? SEPRTR CPTLT? is changed to CONCTR. The token ARTICL in the token list ARTICL SEPRTR is transformed to the token CPTLTA.

Substage 1.2 also processes the patterns associated with two person names which share one last name. In that case, the two first names are consolidated into a single first name (e.g., the token list FRSTNM INITAL CONCTR XXXXXX INITAL LASTNM for "John K. and Sherriana F. Smith" becomes FRSTNM LASTNM). There are many patterns in this category because of the following situations: a) the last name is not always known, b) the first name could be something other than a common American first name, and c) the middle name is optional.

Finally, substage 1.2 processes the pattern associated with organization names which consist of two last names and one conjunction. Those token lists are consolidated into the single token ORGWRD (e.g., the token list LASTNM CONCTR LASTNM for "Johnson & Johnson" becomes ORGWRD).

Substage 1.3, represented by box 506 in FIG. 5, cleans the surroundings of the tokens VERSUS, CROLES, CROLEP, and DLMTER. First, the punctuation, delimiters, and legal procedural phrases that follow the token VERSUS are deleted (e.g., the token list VERSUS PPINRE PNCCOL representing "V. in re:", is consolidated to the token VERSUS).

Punctuation and other occurrences of the tokens CROLES and CROLEP, which appear before or after the first occurrence of those tokens, are consolidated into a single token. For example, the token list DLMTER PNCCMA CROLEP CONCTR CROLEP for "et al., Appellee and Defendants" is consolidated into the token CROLEP. (The transformation would be the same if the token CROLEP were instead the token CROLES).

Substage 1.3 also removes the punctuation which appears before or after the token DLMTER.

Substage 1.4, represented by box 508 in FIG. 5, processes patterns associated with the tokens INITLV, CPTLTV, PPINRE, PPXPRT, PROBAT, WRITSW, JRSSTA, JRSLOC, OBJWRD, PNCQUO, and STATNM.

The tokens INITLV and CPTLTV are changed to the token VERSUS if they appear next to the tokens CROLES or CROLEP and there is another corresponding CROLES or CROLEP on the right side. Otherwise, the token INITLV is changed to the token INITAL.

Substage 1.4 also processes the patterns associated with the token PPINRE (procedural phrase "in re") or PPXPRT (procedural phrase "ex parte"). Tokens PPINRE and PPXPRT are consolidated with procedural phrases, punctuation or descriptions which appear next to them. This substage consolidates a token list consisting of PPINRE (or PPXPRT), the tokens CONCTR, DTMNER, PPPROC, PRPSOF, PRPSTN and WRITSW, and the token PNCCOL, PRPSOF, or PRPSTN into a single token PPINRE (e.g., the token list PPINRE DTMNER PPPROC PRPSOF for "In the matter of the construction of" becomes PPINRE).

Substage 1.4 also processes the patterns associated with the token PPXREL. Punctuation which occurs before or after the token PPXREL is consolidated into the token PPXREL (e.g., the token list PPXREL PNCCMA for "ex rel," becomes PPXREL).

Similarly, the token PROBAT and any prepositions or punctuation which appear next to it are consolidated into the token PROBAT. For example, the token list PROBAT PRPSOF for "will of" becomes PROBAT.

The token WRITSW and any adjacent prepositions are consolidated into the token WRITSW. For example, the token list PRPSOF WRITSW for "of habeas corpus" becomes WRITSW.

Substage 1.4 also consolidates the tokens representing phrases such as "the State of Ohio" and "the City of New York" into a single token. For example, the token list DTMNER JRSSTA PRPSOF STATOH for "the State of Ohio" is consolidated into the single token JRSSTA. Similarly, the token list DTMNER JRSLOC PRPSOF STATNY for "the City of New York" is consolidated into the single token JRSLOC.

Substage 1.4 also consolidates token lists which express the notion of dollar amounts into the single token OBJWRD. For example, the token list PNCDOL DIGITS PNCCMA DIGITS for "$100,000" becomes OBJWRD.

Substage 1.4 also processes patterns which represent a person's nickname. For example, the token list FRSTNM PNCQUO XXXXXX PNCQUO for "John 'Lefty'" is consolidated to FRSTNM.

Finally, substage 1.4 transforms the tokens which represent individual state names, such as STATOH, into the more abstract token STATNM which represents a generic state name.

Substages 1.5 through 1.8 differ conceptually from substages 1.1 through 1.4 in that the earlier substages consolidate and delete tokens while the latter substages transform complete token lists.

Substage 1.5, represented by box 510 in FIG. 5, transforms type 1 LCNs which have more than one "divider" (VERSUS) into type 3 LCNs. This process is accomplished by removing all of the tokens from the second occurrence of the token VERSUS to the end of the LCN token list. For example, the token list representing the LCN "John Smith, Appellant, v. The Third Street Corp., Defendant, v. Mary Wolf" is transformed into the token list representing "John Smith, Appellant, v. The Third Street Corp., Defendant,".

Substage 1.6, represented by box 512 in FIG. 5, transforms type 2 LCNs which have more than one "divider" (VERSUS) into type 3 or type 4 LCNs. In other words, for LCNs of type 2, substage 1.6 removes all tokens except for those in the first case name. For example, the token list representing the LCN "John Smith, Appellant, v. The Third Street Corp., Defendant; The Third Street Corp. v. John Smith" is transformed into the token list representing "John Smith, Appellant v. The Third Street Corp., Defendant;". Similarly, the token list representing the LCN "In re the will of John Smith; The Third Street Corp. v. John Smith" is transformed into the token list representing "In re the will of John Smith;".

Substage 1.7, represented by box 514 in FIG. 5, performs two different tasks for type 3 LCNs. Substage 1.7 removes "in re" case names which follow the first case name and removes the "in re" tokens which appear at the beginning of type 3 LCNs. An example of the first task would be the transformation of the token list representing the LCN "John Smith v. The Third Street Corp.; In re the will of John Smith" into the token list representing "John Smith v. The Third Street Corp.;". An example of the second type of task would be the transformation of the token list representing the LCN "In re: John Smith v. The Third Street Corp." into the token list representing "John Smith v. The Third Street Corp.".

Substage 1.8, represented by box 516 in FIG. 5, performs the following two tasks. First, substage 1.8 removes tokens which do not provide any contextual information for future parsing. Second, substage 1.8 attempts to add VERSUS into an LCN in which VERSUS is not present but is implied.

Substage 1.8 first removes tokens which occur between the tokens CROLES, CROLEP, ADVERB, or PNCSEM and the token VERSUS or the end of an LCN. Then, if the LCN has two symmetric tokens which are either CROLES or CROLEP but does not have the token VERSUS, the first occurrence of CROLES or CROLEP is changed into the VERSUS token.

For example, substage 1.8 changes the token list representing the LCN "John Smith, Appellant, The Third Street Corp., Defendant." into the token list representing "John Smith, v. The Third Street Corp., Defendant.".

The substages of stage 2, substages 2.1 through 2.4, are executed after stage 1. In general, stage 2 identifies prepositional phrases and other descriptive phrases. Stage 2 differentiates the preposition "of" from other prepositions. The "of" phrases are usually part of a party name. On the other hand, other prepositional phrases generally function as descriptive phrases. Descriptive phrases also include phrases led by an article (e.g., "an infant"), phrases which designate various titles of persons (e.g., "County Sheriff"), and participle phrases (e.g., "known as Johnny").

After execution of each of the substages 2.1 through 2.4, the output from that substage in the form of a token line and a command line are passed to the consolidate module 316 and then to the next substage. Each of the substages 2.1 through 2.4 is described below in more detail.

Figure 6:
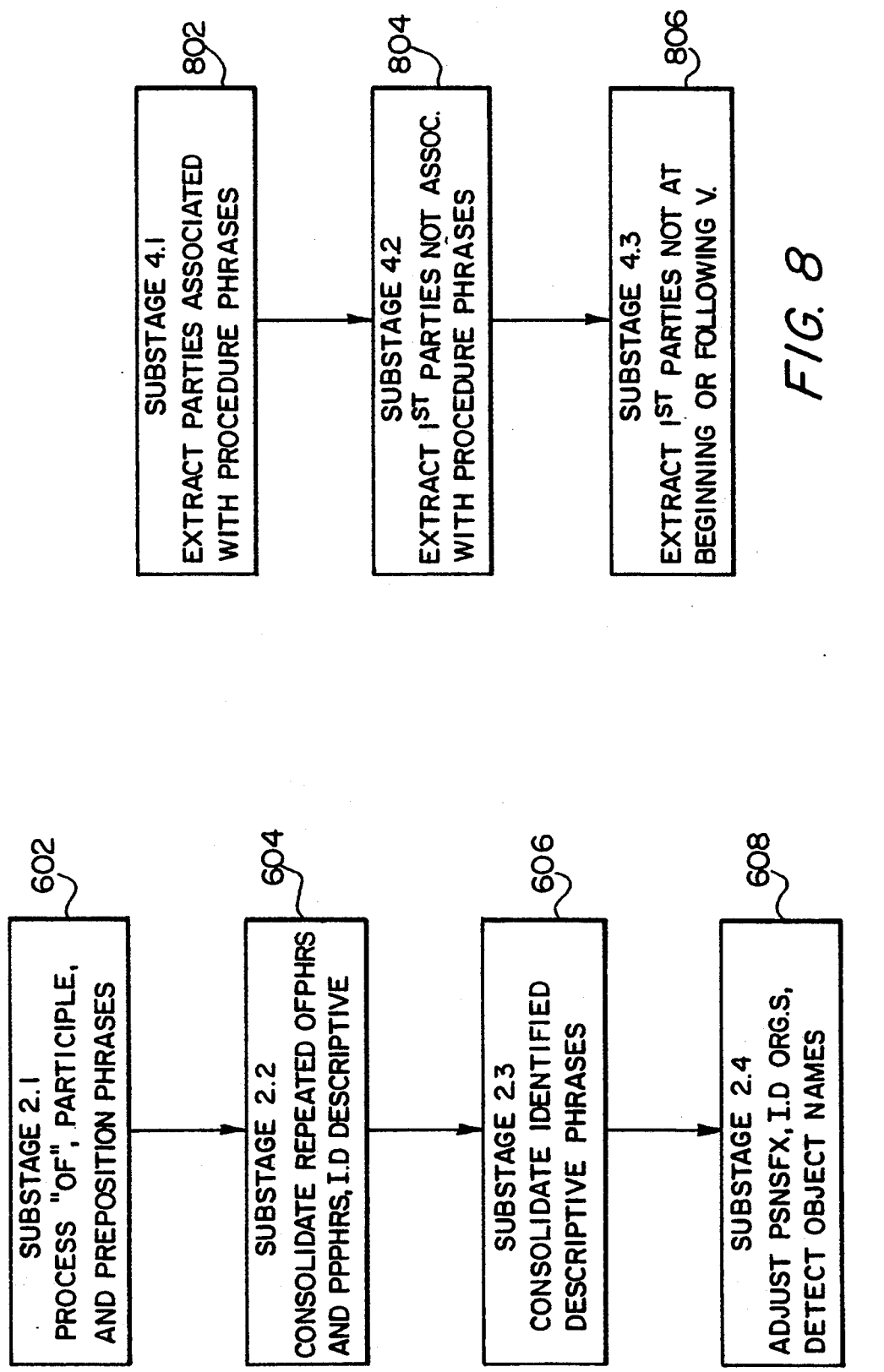
FIG. 6 is a flow diagram of module stage 2 of the preferred embodiment of the present invention.

Substage 2.1, represented by box 602 in FIG. 6, processes the "of" phrases (OFPHRS), the prepositional phrases (PPPHRS), and the participle phrases (OBJPPL, ORGPPL, PRTCPL, and PSNPPL). Substage 2.1 recognizes those phrases and replaces the tokens in the phrase with a single token representing the type of phrase.

"Of" phrases are characterized by beginning with the token PRPSOF and ending at the end of the LCN or one of the following tokens: ARTICL, CROLEP, DLMTER, OBJPPL, ORGDES, ORGPPL, ORGSFS, ORGSFW, PNCCMA, PNCCOL, PNCSEM, PPINRE, PPXPRT, PPXREL, PRPSOF, PRPSTN, PRTCPL, PSNPPL, SEPRTR, or VERSUS. For example, the token list XXXXXX PRPSOF DTMNER XXXXXX XXXXXX PNCCMA representing "ACM of the Greater Dayton," becomes XXXXXX OFPHRS PNCCMA.

However, substage 2.1 marks the token list for review by a human editor if the "of" phrase contains the token UNNWRD or the token list NUMIND DIGITS. The presence of that token or token list usually signifies a union name which is very difficult to correctly convert. To indicate that a human editor needs to review the LCN, the "of" phrase is replaced with the token STPWRD.

A prepositional phrase (PPPHRS) is characterized in that it begins with the token PRPSTN and ends at the end of the LCN or one of the tokens listed above as indicating the end of an "of" phrase. For example, the token list PRPSTN XXXXXX STATNM SEPRTR representing "in Northern California and" is processed by substage 2.1 and becomes PPPHRS SEPRTR.

A participle phrase begins with one of the tokens OBJPPL, ORGPPL, PRTCPL, or PSNPPL, and stops at the end of the LCN or one of the tokens listed above as indicating the end of an "of" phrase. The tokens representing the participle phrase are replaced with a single token representing the participle. For example, the token list PRTCPL FRSTNM XXXXXX PNCCMA representing "known as Sam Cefalu," is processed by substage 2.1 to become PRTCPL PNCCMA.

Substage 2.2, represented by box 604 in FIG. 6, consolidates repeated "of" phrases (OFPHRS) and repeated prepositional phrases (PPPHRS) and identifies other descriptive phrases. Substage 2.2 consolidates repeated "of" phrases or prepositional phrases by combining repeated occurrences of the tokens OFPHRS and PPPHRS. For example, the token list OFPHRS OFPHRS becomes OFPHRS.

The other function of substage 2.2 is to recognize and identify various descriptive phrases. The descriptive phrases are broken down into four categories: person descriptions, organization descriptions, object descriptions, and general descriptions.

With regard to person descriptions, the following operations take place. The token PSNSFX is changed to the token PSNTTL if (a) it occurs at the beginning of an LCN or after the token VERSUS, PPINRE, or PPXPRT, and (b) it proceeds the token FRSTNM or INITAL. For example, the token list VERSUS PSNSFX FRSTNM representing "V. Counselor John" becomes VERSUS PSNTTL FRSTNM.

The token ORGOFF and the token immediately preceding it are replaced by the token PSNTTL if (a) the preceding token is ORGWRD or JRSLOC, and (b) the token which follows ORGOFF is FRSTNM. For example, the token list JRSLOC ORGOFF FRSTNM for "County Sheriff John" becomes PSNTTL FRSTNM.

The token PSNPPL (participle indicating a person) is changed to the token PSNDES (person descriptor).

Person pronoun phrases are changed to the token PSNDES. A person pronoun phrase starts with the token list PNCCMA PSNPRN and ends with one of the following tokens: ARTICL, CROLEP, DLMTER, OBJPPL, ORGDES, ORGPPL, ORGSFS, ORGSFW, PNCCMA, PNCCOL, PNCSEM, PPINRE, PPXPRT, PPXREL, PRPSOF, PRPSTN, PRTCPL, PSNPPL, SEPRTR, and VERSUS.

The token list PNCCMA ARTICL PSNSFX (or PSNDES or PSNPPL) is changed to the token list PNCCMA PSNDES. For example, the token list PNCCMA ARTICL PSNSFX representing ", a minor" becomes PNCCMA PSNDES.

The token ORGOFF is replaced with the token PSNDES when it occurs after the token PNCCMA and before one of the tokens listed above as indicating the end of a person pronoun phrase. The person descriptive token list is consolidated. For example, the token list PNCCMA ARTICL XXXXXX PSNDES representing ", a respected Admiral" is changed to PNCCMA PSNDES.

Organizational descriptions are processed in the following manner. An organizational descriptive token list is consolidated into the token ORGDES if it starts with the token ARTICL and also has one of the following tokens: AGENCY, CTRYNM, JRSLOC, JRSSTA, ORGDES, ORGOFF, ORGTYP, ORGWRD, STATNM, or UNNWRD. For example, the token list PNCCMA ARTICL XXXXXX ORGDES representing ", a new co-partnership" is consolidated into the token list PNCCMA ORGDES. Additionally, the token list ARTICL ORGSFW or the single token ORGPPL is transformed to the token ORGDES.

Further, a token list is transformed to the token ORGDES if it (a) occurs after PNCCMA, (b) contains the token ORGOFF, and (c) stops at one of the tokens listed above as indicating the end of a person pronoun phrase. For example, the token list PNCCMA JRSLOC ORGOFF XXXXXX PNCCMA representing ", County Sheriff Building," is replaced with the token list PNCCMA ORGDES PNCCMA.

Object descriptions are recognized and processed in the following manner. A token list is replaced with the token OBJDES if it (a) occurs after PNCCMA, (b) contains the token BOATNM, BOATTP, CONTNR, LOCWRD, OBJDES, OBJWRD, STRTTP, or VHCLTP, and (c) stops at one of the tokens listed above as indicating the end of a person pronoun phrase. For example, the token list PNCCMA ARTICL XXXXXX XXXXXX OBJWRD PNCSEM representing ", a recently published book;" is replaced with the token list PNCCMA OBJDES PNCSEM. Additionally, the token OBJPPL is replaced with the token OBJDES.

General descriptive phrases are recognized and processed in the following manner. A token list is transformed to the token ALLDES if it occurs after the token PNCCMA and ends with one of the tokens listed above as indicating the end of a person pronoun phrase or extends to the end of an LCN. Additionally, the token PRTCPL is replaced with the token ALLDES. Also, token lists are replaced with the token ALLDES if they begin with the token ARTICL and end with one of the tokens listed above as indicating the end of a person pronoun phrase or extend to the end of an LCN.

Substage 2.3, represented by box 606 in FIG. 6, consolidates identified descriptive phrases. Substage 2.3 accomplishes the following consolidations and transformations with regard to person descriptions, organization descriptions, object descriptions and general descriptions.

With regard to person descriptions, substage 2.3 consolidates the tokens PSNDES or PSNSFX and the token(s) OFPHRS or PPPHRS into the corresponding token PSNDES or PSNSFX. The token list PSNDES ALLDES is consolidated into the token PSNDES. The token list PNCCMA ORGOFF OFPHRS (or PPPHRS) is consolidated into the token list PNCCMA PSNDES. The token list ORGOFF PSNDES OFPHRS (or PPPHRS) is consolidated into the single token PSNDES.

Additionally, the token list XXXXXX PSNDES is consolidated into the token PSNDES if it occurs at the beginning of an LCN or after the token VERSUS. Finally, the token list PSNDES ORDNUM is consolidated into the single token PSNDES.

With regard to organization descriptions, substage 2.3 performs the following consolidations. ORGDES and the token(s) OFPHRS or PPPHRS are consolidated into the token ORGDES. The token list ORGDES ALLDES is consolidated into the single token ORGDES. The token PSNDES is changed to the token ORGDES if it occurs next to ORGTYP. The token list ORGSFW OFPHRS is consolidated into the single token ORGSFW. The token list ORGSFW PNCCMA ORGSFS (or ORGSFW) is changed into the token list ORGWRD PNCCMA ORGSFS (or ORGSFW). The token list UNNWRD OFPHRS is consolidated into the single token UNNWRD. The token lists ORGOFF PSNDES, ORGOFF OFPHRS or ORGOFF PPPHRS are consolidated into the token ORGOFF. The token list ORGWRD NUMIND DIGITS is consolidated into the token ORGWRD. Lastly, the token list ORGOFF ORGTYP is changed to the token list ORGWRD ORGTYP. With regard to object descriptions, the token list OBJDES ALLDES is consolidated into the token OBJDES.

With regard to general descriptions, the following consolidations are performed. The token list of repeated tokens ADDLES is consolidated into a single occurrence of the token ALLDES. The occurrence of the token ALLDES and the token(s) OFPHRS or PPPHRS are consolidated into the single token ALLDES. Lastly, the token list PPPHRS OFPHRS is consolidated into the token PPPHRS.

Substage 2.4, represented by box 608 in FIG. 6, adjusts the token PSNSFX, identifies a special type of organization and detects object names. Specifically, substage 2.4 changes the token PSNSFX to the token XXXXXX if it does not occur (a) after PNCCMA, (b) at the end of an LCN, or (c) before one of the following tokens: CONCTR, CROLEP, CROLES, DLMTER, FRSTNM, INITAL, PNCCMA, PNCSEM, PSNDES, PSNSFX, SEPRTR, or VERSUS. Substage 2.4 also processes special type organization names similar to the following two examples: 1. Wilmer, Cutler & Pickering; 2. Orville, Park, Nixon and Associates. The words in these two examples except "&", "and" and "Associates" are called ORGTKN, which represents the tokens listed below. Note that there is a comma which follows each ORGTKN and the pattern ORGTKN PNCCMA repeats itself until another pattern ORGTKN SEPRTR (or CONCTR) ORGTKN (or ORGTYP) occurs. ORGTKN can be one of the following tokens: AGENCY, BOATTP, CPTLTA to CPTLTZ, CARWRD, CTRYMN, JRSLOC, INITAL, LASTNM, OBJWRD, ORGOFF, ORGTKN, ORGWRD, STATNM, VHCLTP, XXXXXX.

In addition, the SCN parser expects that the special type organization names are the first party names on either side of VERSUS. In other words, the names occur at the beginning of LCN or after VERSUS or PPINRE and stop at one of the tokens listed above as indicating the end of a person pronoun phrase. For example, token list XXXXXX PNCCMA ORNTNM PNCCMA LASTNM SEPRTR ORGTYP VERSUS for "Orville, Park, Nixon and Associates v." is transformed into ORGTYP VERSUS.

Lastly, substage 2.4 performs the following transformation with regard to an object name. When the token ARTICL occurs at the beginning of an LCN or after VERSUS or PPINRE, it signifies an object party name.

A token list which starts with ARTICL and stops at one of the tokens listed above which indicates the end of a person pronoun phrase is changed to the token OBJWRD. For example, the token list ARTICL DIGITS CARWRD XXXXXX PNCCMA representing "a 1985 Toyota Camry," is transformed into the token list OBJWRD PNCCMA.

Figure 7:
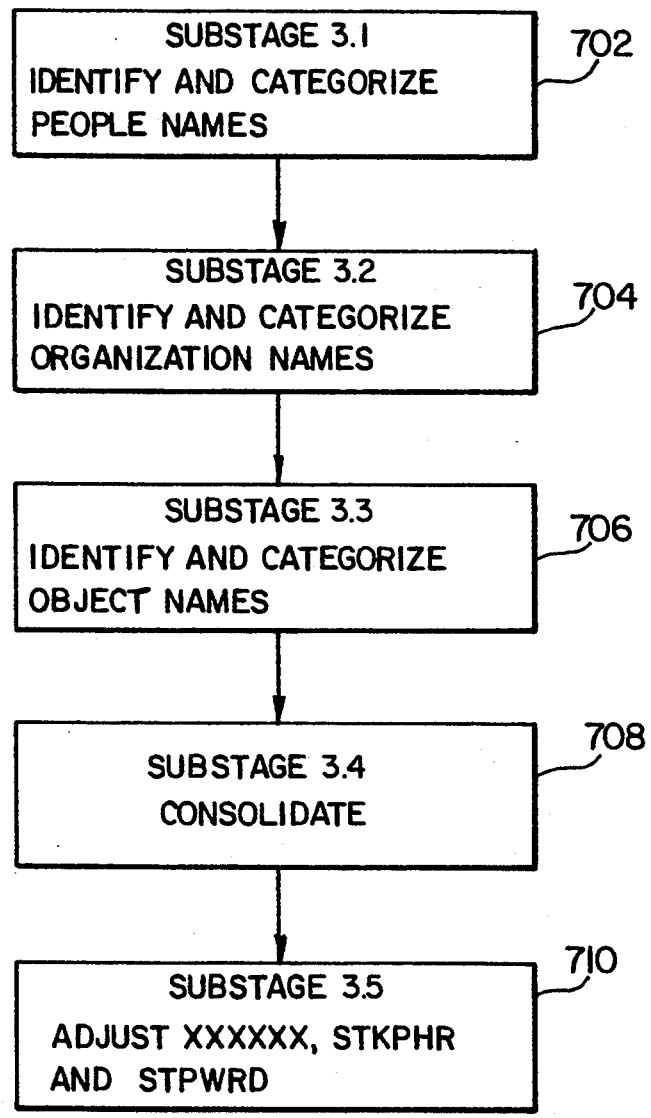
FIG. 7 is a flow diagram of module stage 3 of the preferred embodiment of the present invention.

After each of the substages 2.1 through 2.4 has been executed, control then passes to stage 3 which includes the substages 3.1 through 3.5 depicted in FIG. 7. The stage 3 modules identify proper nouns that designate individual persons, organizations or objects which are located and consolidated.

Substage 3.1 represented by the box labeled 702 in FIG. 7, performs the functions of identifying and categorizing person names. A list of tokens which is recognized as a person name is replaced with the token PSNPTY (person party). Substage 3.1 deals with seven different cases.

First, substage 3.1 identifies person names with a known first name, middle name and a last name. A known first name comes from the following group of tokens: CPTLT?, CARWRD, FRGNNM, FRSTNM, INITAL, INITLV, SPPGNM. A middle name may have one or two tokens which represent either initial(s) or full middle name(s). The tokens of a middle name come from the token group above. A last name may have one to three tokens from the following token group: FRGNNM, FRSTNM, LASTNM, MLTWNM, NATVNM, ORNTNM, STATNM, STPWRD, STRTTP, XXXXXX. Finally, the tokens in the following group usually indicate the right side boundary of a person name: ADVERB, ALLDES, CONCTR, CROLES, CROLEP, DLMTER, OFPHRS, ORGOFF, PNCCMA, PNCCOL, PNCSEM, PNCSLA, PPINRE, PPPHRS, PPXPRT, PPXREL, PRPSOF, PRPSTN, PSNDES, PSNSFX, RMNNUM, SEPRTR, STKPHR, VERSUS, WRITSW. For example, the token list FRSTNM INITAL XXXXXX PSNSFX for "John K. Smith Jr." becomes PSNPTY PSNSFX. Additionally, the token list FRSTNM FRGNNM MLTWNM XXXXXX PNCCMA for "John Abbas van Rijisberge," becomes PSNPTY PNCCMA.

Substage 3.1 assumes that the token PROBAT indicates the right boundary of a person name, and thus uses it to identify a person name. For example, the token list PPINRE FRSTNM XXXXXX PROBAT for "In re John Smith's Will" becomes PPINRE PSNPTY PROBAT.

Another case handled by substage 3.1 is that of person names with a known last name. This situation usually consists of the following three components: 1) zero or more tokens from the following group: CPTLT?, FRGNNM, FRSTNM, INITAL, INITLV, LASTNM, MLTWNM, NATVNM, ORNTNM, SPPGNM, STATNM, XXXXXX; 2) the token LASTNM; and 3) a token from the group above which indicates the right side boundary of a person name. For example, the token list INITAL INITAL LASTNM CROLES representing "T. C. Johnson Appellant" is transformed to PSNPTY CROLES.

Another case handled by substage 3.1 is that of a person name with an unknown first name. This case consists of the following four components: 1) the token XXXXXX; 2) one or two tokens from the first name group above; 3) one of the following tokens: FRGNNM, FRSTNM, ORNTNM or SPPGNM; and 4) a token from the group above which indicates the right side boundary of a person name. For example, the token list XXXXXX INITAL SPPGNM PNCCMA for "Alehundro G. Tulio," is transformed to PNSPTY PNCCMA.

Another case which is recognized by substage 3.1 is that of person names with a last name occurring first. This case consists of the following four components: 1) one token from the following group: XXXXXX, FRGNNM, FRSTNM, LASTNM, MLTWNM, NATVNM, ORNTNM, STATNM, STPWRD, STRTTP which represents a last name; 2) the token PNCCMA; 3) one or two tokens from the group above which represents a first name and/or a middle name; and 4) one token from the group above which indicates the right side boundary of a person name. For example, the token list LASTNM PNCCMA INITAL INITAL SEPRTR representing "Johnson, D.C. and" is transformed to PSNPTY SEPRTR.

Another case recognized by substage 3.1 is that of person names indicated by their context tokens. A token list which includes one to three repetitions of the token XXXXXX and the token PSNDES is recognized and transformed to the token list PSNPTY PSNDES. Similarly, the token list represented by one to three repetitions of the token XXXXXX and the token PSNSFX is transformed to the token list PSNPTY PSNSFX. The token list ORGOFF XXXXXX (one to two occurrences) is changed to the token list ORGOFF PSNPTY. The token list of a Spanish or Portuguese name is changed to PSNPTY. Such a token list consists of four to six tokens from the following sequence with the token MLTWNM as a mandatory token: FRGNNM, INITAL, MLTWNM, SPPGNM, XXXXXX. For example, the token list SPPGNM INITAL INITAL MLTWNM XXXXXX representing "Valle E. I. du Pont" is transformed to PSNPTY.

Finally, substage 3.1 recognizes foreign names, native American names and Oriental names. Those names consist of four components: 1) zero to two tokens from the token group: INITAL, NATVNM, ORNTNM, XXXXXX; 2) one to three tokens which are repeated FRGNNM, NATVNM or ORNTNM; 3) zero to two tokens from the token group: INITAL, NATVNM, ORNTNM, XXXXXX; and 4) one token from the token group above which indicates the right side boundary of a person name. For example, the token list ORNTNM ORNTNM XXXXXX PNCCMA for "Wang Hong Jia," is transformed to PSNPTY PNCCMA.

Substage 3.2 represented by the box labeled 704 in FIG. 7 identifies and categorizes organization names. Substage 3.2 recognizes six cases or categories of organization names.

The first case is union names. Union names are the most complex organization names found in LCNs. In general, there are two components in the union name, usually separated by a comma. Component one is the token UNNIND. Component two consists of one or more tokens from the following token group: ADVERB, AGENCY, ALLDES, BOATTP, BOATPT, CARWRD, CONCTR, CONTNR, COURTT, CPTLT?, CRDNUM, CTRYNM, DIGITS, DTMNER, FRGNNM, FRSTNM, INITAL, INITLV, JRSLOC, JRSSTA, LASTNM, LOCWRD, MLTWNM, NATVNM, OBJWRD, OFPHRS, ORDNUM, ORGDES, ORGOFF, ORGTYP, ORGWRD, ORNTNM, OTHPRN, PPPROC, PSNPRN, RMNNUM, SPPGNM, STATNM, STRTTP, UNNWRD, VHCLTP, XXXXXX. The token list which represents a union name is either in the form of "component one, component two" or of "component two, component one". A union token list usually terminates at the occurrence of CROLEP, CROLES, DLMTER, PNCCMA, SEPRTR or VERSUS or at the end of an LCN. In either situation, the union token list is transformed to the token ORGPTY. For example, the token list UNNIND PNCCMA DTMNER ORGWRD XXXXXX CONCTR XXXXXX UNNWRD VERSUS representing "Local 6, the International Longshoremen's and Warehouse Men's Union v." is transformed to ORGPTY VERSUS.

Other union token lists are marked for human editors to process. An example of such a union name is "Local Unions 545, 545-A, 545-B and 545-C, International Union of Operating Engineers". Such a name is very difficult for a computer program to analyze.

Sometimes a union name is comprised of only one component, that component being component two described above. If the last token in component two is UNNWRD and the token next to it is CROLEP, CROLES, DLMTER, PNCSEM or VERSUS or UNNWRD as the last token in the LCN, the token list which represents component two is transformed to the token ORGPTY.

Substage 3.2 consolidates the token list JRSSTA OFPHRS into the single token JRSSTA.

Substage 3.2 also recognizes token lists which contain the token COURTT and the tokens from the group above identified as part of the union name when the token list ends at the token CROLEP, CROLES, DLMTER, PNCCMA, PNCSEM, PSNPTY, SEPRTR or VERSUS, or at the end of the LCN. That token list is consolidated into the single token ORGPTY.

Substage 3.2 also recognizes organization names which are identifiable through organization indicator tokens. Those organization names consist of the tokens from the group above identified as part of a union name plus the tokens NUMIND and PSNPTY and one of the following tokens at the end of their name which indicates the right side boundary of the organization name: ALLDES, ORGDES, ORGSFS, ORGSFW, ORGTYP. In addition, the token ORGTYP may have the token OFPHRS next to it. When such a token list is identified, the entire token list except for ALLDES and ORGDES is consolidated into the token ORGPTY. For example, the token list XXXXXX XXXXXX ORGWRD PNCCMA ORGSFW representing "HVIDE Marine International, Inc." is transformed to the token ORGPTY. In another example, the token list XXXXXX CONCTR LASTNM PNCCMA ORGDES representing "Smith & Larson, Attorneys at Law" becomes ORGPTY PNCCMA ORGDES.

Substage 3.2 consolidates the token list DTMNER CTRYNM into the single token ORGPTY. This transforms "the United States" into an organization name.

Finally, if a token list consists of the tokens grouped above as being a part of a union name and contains at least one of the following tokens: AGENCY, CARWRD, JRSLOC, JRSSTA, ORGTYP, ORGWRD, ORGOFF or STATNM, and terminates at the occurrence of CROLEP, CROLES, DLMTER, DTMNER, PNCCOL, PNCCMA, PNCSEM, PPINRE, PPPHRS, PPXPRT, PPXREL, PSNPTY, SEPRTR or VERSUS, that token list is consolidated into the token ORGPTY.

Substage 3.3 identifies and categorizes object names. This substage first recognizes object names which are identifiable through object indicator tokens. These object names consist of the tokens from the following group (referred to hereinafter as the "object identifier tokens") and the token OBJDES or the token list PNCCMA OBJDES at the end of the names which indicate the right side boundary of the object names. The object identifier tokens include: AGENCY, BOATNM, BOATPT, BOATTP, CARWRD, CONCTR, CONTNR, CPTLT?, CRDNUM, CTRYNM, DIGITS, FRSTNM, INITAL, INITLV, JRSLOC, LASTNM, LOCWRD, MLTWNM, NATVNM, NUMIND, OBJWRD, OFPHRS, ORDNUM, ORGOFF, ORGWRD, ORNTNM, OTHPRN, PNCQUO, PNCSLA, PPPHRS, PSNPRN, PSNPTY, PSNTTL, RMNNUM, SPPGNM, STATNM, STRTTP, VHCLTP, XXXXXX.

When such a token list is identified, the token list is consolidated except for the token OBJDES or the token list PNCCMA OBJDES into the single token OBJPTY. For example, the token list DIGITS OBJWRD OBJDES representing "42 jars more or less" is transformed to the token list OBJPTY OBJDES.

If a token list consists of the tokens grouped above as indicating objects and contains at least one of the following tokens: BOATNM, BOATPT, BOATTP, CONTNR, LOCWRD, OBJWRD, STRTTP, VHCLTP; and terminates at the token CROLEP, CROLES, DLMTER, ORGPTY, PNCCMA, PNCSEM, PPINRE, PPPHRS, PPXPRT, PPXREL, PSNPTY, SEPRTR or VERSUS, the token list is consolidated into the token OBJPTY. For example, the token list DIGITS LOCWRD OFPHRS PNCCMA representing "150.00 acres of land" is transformed to the token list OBJPTY PNCCMA.

Substage 3.3 also recognizes object names which are indicated by a leading article (ARTICL). When the token ARTICL occurs at the beginning of an LCN or immediately after the token VERSUS, the token usually indicates that the first party is an object. The object usually stops at the occurrence of CROLEP, CROLES, DLMTER, OBJDES, ORGPTY, PNCCMA, PNCSEM, PPINRE, PPPHRS, PPXPRT, PPXREL, PSNPTY, SEPRTR or VERSUS. Such a token list, except the last token, is consolidated into the token OBJPTY. For example, the token list VERSUS ARTICL OBJDES OBJWRD PNCCMA representing "v. an Obscene Book" becomes VERSUS OBJPTY.

Substage 3.3 also recognizes object names in the form of an address. When a real estate property is a party name, it is often expressed in the form of an address. The corresponding token list for this type of party name always terminates with the token STRTTP. Such a token list is consolidated into the token OBJPTY. For example, the token list DIGITS XXXXXX XXXXXX STRTTP representing "1118 Cambridge Station Road" becomes OBJPTY.

Finally, substage 3.3, represented by the box labelled 706 in FIG. 7, recognizes boat names. Boat names are among the most frequent object names occurring in LCNs. Occasionally, it is difficult to recognize boat names because of human creativity in naming a boat. Boat names tend to begin with the token DTMNER, contain the tokens grouped above as indicating objects, and stop at the occurrence of CROLEP, CROLES, DLMTER, ORGPTY, PNCCMA, PNCSEM, PPINRE, PPPHRS, PPXPRT, PPXREL, PSNPTY, SEPRTR or VERSUS. Frequently, an entire LCN can consist of a single boat title. In either situation, the token list is consolidated into the token OBJPTY. For example, the token list DTMNER BOATNM XXXXXX FRSTNM representing "the F.V. Lady Jay" becomes OBJPTY.

In general, substage 3.4, represented as box 708 in FIG. 7, consolidates the token lists processed in substages 3.1 through 3.3. Substage 3.4 deals with four specific cases which are discussed below.

The first case which substage 3.4 deals with involves the token PSNPTY (person party). This substage consolidates the token list LASTNM PSNPTY into the single token PSNPTY. The token lists DTMNER PSNTTL or DTMNER PSNDES are removed from the token list DTMNER PSNTTL PSNPTY and DTMNER PSNDES PSNPTY, respectively. The tokens PSNTTL and PSNDES are removed from the token lists PSNTTL PSNPTY and PSNDES PSNPTY, respectively. The token LASTNM or the token list LASTNM XXXXXX is transformed to the single token PSNPTY. The token lists ORGPTY PNCCMA PSNSFX and ORGPTY PSNSFX are transformed to PSNPTY PNCCMA PSNSFX and PSNPTY PSNSFX, respectively. The token list _PSNPTY, with the _ being filled by FRGNNM, FRSTNM, INITAL or MLTWNM, is transformed to the single token PSNPTY.

Substage 3.4 also consolidates token lists pertaining to the token ORGPTY (organization party). Each of the following token lists is transformed by substage 3.4 into the single token ORGPTY:

DTMNER ORGPTY
ORGPTY PNCCMA OFPHRS PNCCMA ORGSFW (or ORGSFS)
PSNPTY PNCCMA ORGSFW (or ORGSFS)
PSNPTY ORGSFW (or ORGSFS)
ORGPTY PSNPTY PNCCMA ORGDES
ORGPTY PSNPTY ORGDES
PSNPTY PNCCMA ORGDES (or PSNPTY ORGDES)
ORGPTY OFPHRS NUMIND DIGITS
DTMNER PSNDES (or PSNSFX) PNCCMA ORGSFW (or ORGSFS) PSNDES (or PSNSFX) PNCCMA ORGSFW (or ORGSFS)

Additionally, the token list DTMNER PSNDES (or PSNSFX) is consolidated into the single token ORGPTY when PSNDES (or PSNSFX) is the last token in the LCN.

Substage 3.4 transforms the token list OBJPTY ORGTYP into the token STPWRD in order to flag that LCN for review and processing by a human editor.

Finally, substage 3.4 removes any token between ORGPTY and PPXREL, between JRSSTA and PPXREL, and between PSNPTY and PPXREL.

Substage 3.5, represented by the box labelled 710 in FIG. 7, further processes token lists which contain the tokens XXXXXX, STKPHR (stock phrase, e.g., "grand jury proceeding") and STPWRD. Each of those three cases is discussed below.

With regard to the token XXXXXX, the following processing takes place. If a token list consists of one to three occurrences of XXXXXX, that token list is consolidated into the token PSNPTY if it is preceded by PSNTTL or PSNDES or if it is followed by PNCCMA PSNSFX or PSNSFX or PSNDES. The token list XXXXXX CONCTR PSNPTY (or ORGPTY) is consolidated into the single token ORGPTY. The token list XXXXXX (one to three occurrences) OFPHRS is consolidated into the token ORGPTY. Finally, if the token list XXXXXX XXXXXX is still present, it is transformed into the token XXXTWO. This token represents two consecutive unknown words and in most situations turns out to represent a person name. However, each LCN whose token list contains the token XXXTWO is later sent to a human editor for review and confirmation.

With regard to the token STKPHR, the following processing takes place. A token list which contains the token STKPHR is consolidated into the single token STKPHR. For example, the token list STKPHR XXXXXX PPPHRS representing "appeal withdrawn at conference with court" becomes STKPHR.

With regard to the token STPWRD, the following processing takes place. The token list STPWRD PSNPTY is consolidated into the single token STPWRD. The token list XXXXXX STPWRD or STPWRD XXXXXX is consolidated into the token STPWRD. The token STPWRD is used in stages 5 and 6 as a flag to indicate that a human editor needs to process the related SCN.

Stage 4 includes substages 4.1 through 4.3. In general, stage 4 extracts (identifies) two first parties when the LCN token list has the token VERSUS. One first party is taken from each side of the VERSUS. One first party is extracted when the LCN token list does not contain the token VERSUS. The only exception is when the LCN contains the token PPXREL because PPXREL introduces a third party whose name must be included in the SCN according to the editorial rules. The token VERSUS is always retained if it occurs in an LCN. The tokens between the extracted tokens and the token VERSUS or between the extracted tokens and the end of the LCN are removed because the SCN parser assumes that they are not part of the first parties. FIG. 8 represents stage 4 and its component substages 4.1 through Substage 4.1, represented by box 802 in FIG. 8, extracts parties associated with procedural phrases. Those procedural phrases are represented by PPXREL, PPINRE, PPXPRT, PROBAT and STKPHR.

With regard to the procedural phrase PPXREL, the following processing takes place. When the token list PSNPTY (or JRSSTA or ORGPTY) PPXREL PSNPTY (or ORGPTY or OBJPTY or XXXTWO or XXXXXX) occurs at the beginning of an LCN or right after VERSUS, it is extracted as a first party and the tokens PSNPTY or ORGPTY on the left side of PPXREL are changed to PERSON or ORGZTN, respectively.

With regard to the tokens PPINRE and PPXPRT, the following token lists are extracted:
PPINRE (or PPXPRT) DTMNER PROBAT (or PPPROC) PSNPTY (or XXXTWO or XXXXXX)
PPINRE (or PPXPRT) PROBAT (or PPPROC) PSNPTY (or XXXTWO or XXXXXX)
PPINRE (or PPXPRT) PSNPTY (or XXXTWO or XXXXXX) PROBAT (or PPPROC)
For each of the above, the token PSNPTY is changed to PERSON.
PPINRE (or PPXPRT) DTMNER PROBAT (or PPPROC) ORGPTY
PPINRE (or PPXPRT) PROBAT (or PPPROC) ORGPTY PPINRE (or PPXPRT) ORGPTY PROBAT (or PPPROC)

PPINRE (or PPXPRT) ORGPTY (or JRSSTA or XXXTWO)

For each of the above, the token ORGPTY is changed to ORGZTN.

PPINRE (or PPXPRT) STKPHR PSNPTY (or ORGPTY)

PPINRE (or PPXPRT) STKPHR

For the two above token lists, the tokens PSNPTY and ORGPTY are changed to PERSON and ORGZTN, respectively.

With regard to the token PROBAT, the following processing takes place. The following token lists are extracted when they occur at the beginning of an LCN: DTMNER PROBAT PSNPTY (or XXXTWO or XXXXXX); PROBAT PSNPTY (or XXXTWO or XXXXXX). Additionally, in each of the foregoing token lists the token PSNPTY is changed to the token PERSON. The token list PSNPTY (or XXXTWO or XXXXXX) PROBAT is extracted when it comprises the complete LCN. Additionally, the token PSNPTY is changed to the token PERSON. Finally, the token list PSNPTY (or XXXTWO or XXXXXX) PNCCMA PROBAT is consolidated into the token STPWRD to indicate that a human editor needs to review this LCN.

The token list STKPHR PSNPTY (or ORGPTY) or the token STKPHR is extracted when it occurs at the beginning of the LCN. Additionally, the tokens PSNPTY and ORGPTY are changed to the tokens PERSON and ORGZTN, respectively.

Substage 4.2, represented by box 804 in FIG. 8, extracts first parties which are not associated with procedural phrases. Each of the tokens grouped below is extracted as a first party when it occurs at the beginning of the LCN or immediately after the token VERSUS: PSNPTY, ORGPTY, JRSSTA, OBJPTY, XXXTWO, XXXXXX, STPWRD. Additionally, the tokens PSNPTY, ORGPTY and OBJPTY are changed to PERSON, ORGZTN and OBJECT, respectively.

Substage 4.3, represented by box 806 in FIG. 8, extracts first parties whose tokens do not occur either at the beginning of the LCN or right after the token VERSUS. Substage 4.3 processes five cases which are described below.

The token list PSNDES (or PSNSFX or ORGOFF) PERSON (or XXXTWO or XXXXXX) is extracted. The token list PSNDES PSNSFX or the token ORGOFF is removed and the token XXXTWO or XXXXXX is changed to the token PERSON. For example, the token list VERSUS ORGOFF XXXTWO becomes VERSUS PERSON.

The token list DTMNER PSNDES ORGZTN is consolidated into the token ORGZTN when it occurs at the beginning of an LCN or right after the token VERSUS.

The token DTMNER followed by XXXXXX is consolidated into the token XXXXXX when it occurs at the beginning of an LCN or right after the token VERSUS, PPINRE or PPXPRT.

The token PPINRE or PPXPRT is removed when it occurs at the beginning of an LCN and the LCN contains the token VERSUS. For example, the token list PPINRE PERSON VERSUS PERSON becomes PERSON VERSUS PERSON.

In the token list PPXREL PSNPTY (or ORGPTY or OBJPTY) the token PSNPTY, ORGPTY or OBJPTY is changed to the token PERSON, ORGZTN or OBJECT, respectively. Also, when the token PPXREL precedes the token VERSUS or is the last token in the LCN, the token PPXREL and its preceding token are consolidated into the token STPWRD. This indicates to the system that a human editor will need to examine this LCN to determine why there is no party after the phrase represented by the token PPXREL (ex rel).

Module stage 5 represented by box 328 in FIG. 3, implements most of the SCN editorial rules. These rules have been created using the principles contained in the Blue Book as a guideline. Stage 5 receives input from three files: the file Trace.stage4.3 327 of terminal tokens (and associated addresses) created by the consolidate module after execution of the substage 4.3 module, the file of low-level tokens (and associated addresses) created by the consolidate module after execution of the substage 1.3 module, and the LCN text itself from the file produced by the module prepareLCN. Module stage 5 also receives a two-letter code which represents the jurisdiction from which the current batch of LCNs originates. The jurisdiction code is used to select the proper set of rules based upon the jurisdiction of the case.

The terminals' addresses are used to determine which of the tokens represent parties and legal terms which should be included in the SCN. The terminals themselves (and sometimes the LCN text) are used to determine which of the editorial rules apply to these parties. The stage 5 module uses those rules to delete the appropriate tokens from the token list, leaving only those whose text belongs in the SCN. The output consists of the modified token line (and associated address line) for each LCN in the batch.

Control then passes to module stage 6 represented by box 330 in FIG. 3. Module stage 6 reads the token lines and address lines from the output file 331 of stage 5 and the LCN text from the output file of the module prepareLCN. Module stage 6 uses the addresses to convert the tokens back to the LCN text they represent. This module then executes the editorial rules that could not be performed at the token level by the module stage 5. The resulting output is an SCN for each token list in the input, ready to be run through the abbreviate 332 and acronym 334 modules. First, duplicate token lists are eliminated as represented by box 336.

The abbreviate module recognizes certain words and replaces them with their official abbreviations. For example, "Incorporated" is replaced with "Inc.".

The acronym module 334 replaces certain phrases with their official acronyms. For example, "International Business Machines" is replaced with "IBM".

In the preferred embodiment of the present invention, after the acronym module 334 has completed its processing, those LCNs for which multiple SCNs have been generated are then sent to human editors for the selection of the correct SCN. Alternatively, the system could select the correct SCN based upon a weighting scheme or other suitable selection criteria.

Modifications and variations of the above-described embodiments of the present invention are possible, as appreciated by those skilled in the art in light of the above teachings. For example, though the above specific embodiments have been directed to the application of converting the long case names of lawsuits into short case names according to rules derived generally from the principles contained in the "Blue Book", the present invention, as will be obvious to those of ordinary skill in the art, could equally be applied to other applications.

For example, the present invention would be useful in situations where words and phrases are classified and then transformed according to the class to which they belong. Additionally, the present invention could be used to identify the type of legal action a case name represents, to recognize the individual case names in a consolidated lawsuit or to identify and format case names in the body of a document. It is therefore to be understood that, within the scope of the appended claims and their equivalents, the invention may be practiced otherwise than as specifically described.

What is claimed is:

1. Apparatus for transforming a first character string made up of character groups into a second character string format, said apparatus comprising:
   a memory;
   processor means, including:
      means for storing the first character string in said memory;
      tokenizing means for converting each character group into a low-level token in accordance with a first set of rules;
      second tokenizing means, applying a second set of rules to said low-level tokens, for creating high-level tokens, wherein each of said high-level tokens represents one of: a low-level token and a consolidation of low-level tokens;
      culling means, applying a third set of rules to said high-level tokens, for selecting which of the high-level tokens represent character groups that should be included in the second character string format; and
      means for converting, through application of a fourth set of rules, the high-level tokens selected by said culling means into the second character string format.

2. The apparatus of claim 1, further comprising a first dictionary of character groups stored in said memory means, and wherein said tokenizing means includes means for searching said dictionary for a low-level token corresponding to one or more of the character groups in said first character string.

3. A method for using a processor to transform a first character string comprised of character groups into a second character string format, said method comprising the steps of:
   the processor storing the first character string in a storage area;
   the processor converting each character group into a low-level token in accordance with a first set of rules;
   the processor applying a second set of rules to said low-level tokens, for creating high-level tokens, wherein each of said high-level tokens represents one of: a low-level token and a consolidation of low-level tokens;
   the processor applying a third set of rules to said high-level tokens for determining which of the high-level tokens represent character groups that should be included in the second character string format; and
   the processor converting, through application of a fourth set of rules, the character group high-level tokens into the second character string format.

4. The method of claim 3, further comprising the step of:
   the processor searching a dictionary of character groups for a low-level token corresponding to one or more of the character groups in said first character string.

5. Apparatus for transforming a long case name comprised of words, phrases, and punctuation into a short case name format, said apparatus comprising:
   a memory; and
   a processor, including:
      means for storing the long case name in said memory;
      tokenizing means for converting each word, phrase, and punctuation into a low-level token in accordance with a first set of rules;
      second tokenizing means, applying a second set of rules to said low-level tokens, for creating high-level tokens, wherein each of said high-level tokens represents one of: a low-level token and a consolidation of low-level tokens;
      culling means, applying a third set of rules to said high-level tokens, for determining which of the high-level tokens represent text that should be included in the short case name format; and
      means for converting, through application of a fourth set of rules, the text-representing high-level tokens into the short case name format.

6. The apparatus of claim 5, further comprising a first dictionary of words stored in said memory means, and wherein said tokenizing means includes means for searching said dictionary for a low-level token corresponding to one or more words in said long case name.

7. The apparatus of claim 6, further comprising a second dictionary of phrases stored in said memory means, and wherein said tokenizing means includes means for searching said dictionary for a low-level token corresponding to a phrase in said long case name.

8. A computer implemented method for using a processor to transform a long case name made up of words into a short case name format, said method comprising the steps of:
   the processor storing the long case name in a storage area;
   the processor converting each word into a low-level token in accordance with a first set of rules;
   the processor applying a second set of rules to said low-level tokens, for creating high-level tokens, wherein each of said high-level tokens represents one of: a low-level token and a consolidation of low-level tokens;
   the processor applying a third set of rules to said high-level tokens for determining which of the high-level tokens represent words that should be included in the short case name format; and
   the processor converting, through application of a fourth set of rules, the word-representing high-level tokens into the short case name format.

9. The method of claim 8, further comprising the step of:
   the processor searching a dictionary of words for a low-level token corresponding to one or more of the words in said long case name.

10. The method of claim 9, further comprising the step of:
    the processor searching a dictionary of phrases for a low-level token corresponding to one or more groups of the words in said long case name.

11. A computerized short case name generator system which converts a first text string comprised of words to a second text string according to a set of rules, comprising:

a computer memory containing the first text string and a dictionary of words and their corresponding low-level tokens; and a processor, including:

tokenization means for creating a low-level token list by converting each word in the first text string to a low-level token by searching said dictionary for a low-level token corresponding to each word in the first text string and applying a first set of rules to convert each word in the first text string not found in said dictionary to a low-level token;

parser means for consolidating selected ones of said low-level tokens in said low-level token list into high-level tokens, for eliminating selected other ones of said low-level tokens and for creating a high-level token list of said high-level tokens;

culling means for selecting which words represented by the high-level tokens will be included in the second text string according to a second set of rules; and formatting means for converting the selected high-level tokens back into the words they represent to provide the second text string.

12. The system of claim 11, wherein said computer memory means further includes means for storing a phrase dictionary including phrases comprised of groups of words and low level tokens corresponding to the phrases and said tokenization means further includes means for converting selected groups of words into low level tokens by searching the phrase dictionary for phrases corresponding to low level tokens.

13. The system of claim 12, wherein said formatting means further include means for converting selected ones of said words to corresponding abbreviations and acronyms according to a third set of rules.

14. The system of claim 11, further including flagging means for identifying when the output from the culling means is unreliable.

15. A computer implemented method for using a processor to convert a first text string comprised of words to a second text string according to a rule set, the method comprising the steps of:

(a) the processor scanning a word-to-token dictionary to determine if any of the words are in said dictionary;

(b) the processor storing each token which corresponds to a word which matches a word in said dictionary to form a set of lower level tokens;

(c) the processor applying a first set of rules to each unmatched word which does not match a word in said dictionary to convert each of said unmatched words to a lower level token according to said first set of rules;

(d) the processor combining selected ones of said lower level tokens into higher level tokens according to a second set of rules;

(e) the processor deleting selected other ones of said lower level tokens according to a third set of rules;

(f) the processor repeating steps (d) and (e) with lower level tokens and higher level tokens until only higher level tokens remain;

(g) the processor deleting selected ones of said higher level tokens according to a fourth set of rules; and (h) the processor transforming the remaining higher level tokens into the words they represent to provide the second string.

16. The method of claim 15, including the additional step of:

(i) converting a subset of said words provided in step (h) to at least one of: corresponding abbreviations and acronyms.

17. A computer implemented method for using a processor to track the correlation between a first text string comprised of words and a token list in order to provide a second text string, the method comprising the steps of:

(a) the processor creating a token list of low level tokens, the low level tokens corresponding to the words in the text sting;

(b) the processor creating an address string which denotes the correspondence between the low level tokens and the words in the text string;

(c) the processor replacing selected ones and groups of the low level tokens in the token list with higher level tokens;

(d) the processor modifying the address line to maintain the correspondence between the higher level tokens and the words the higher level tokens represent; and (e) the processor converting the higher level tokens back into the words they represent according to the address line to provide the second text string.

18. The method of claim 17, further including the steps of:

the processor deleting selected ones of said higher level tokens; and the processor modifying the address line to maintain the correspondence between the remaining higher level tokens and the words they represent.

19. A computer implemented method for converting a first text string comprised of words to a second text string according to a rule set, the method comprising the steps of:

(a) the computer scanning a word-to-token dictionary to determine if any of the words are in said dictionary, the dictionary having many words correspond to each token;

(b) the computer storing each token which corresponds to a word which matches a word in said dictionary;

(c) the computer applying a first set of rules to each unmatched word which does not match a word in said dictionary to convert each of said unmatched words to a token according to said first set of rules;

(d) the computer creating an address string which denotes the correspondence between the tokens and the words in the first text string;

(e) the computer combining selected ones of said tokens into higher level tokens according to a second set of rules;

(f) the computer modifying the address line to denote the correspondence between the higher level tokens and the words they represent;

(g) the computer deleting selected other ones of said tokens according to a third set of rules;

(h) the computer modifying the address line to maintain the correspondence between the remaining tokens and the words they represent; and (i) the computer repeating steps (e) through (h) with tokens and higher level tokens until only higher level tokens remain wherein said higher level tokens correspond to words of the second text string.

20. The method of claim 19, including the further steps of:

(j) the computer deleting selected ones of said higher level tokens according to a fourth set of rules;

(k) the computer modifying the address line to maintain the correspondence between the remaining higher level tokens and the words they represent; and (1) the computer transforming the remaining tokens into the words they represent according to the address line.

21. Apparatus for transforming a first character string made up of character groups into a second character string, said apparatus comprising:

input means, for providing the first character string; and a processor, including:
identifying means for providing an identification for each character group of said first character string;
consolidation means for consolidating character groups of said first character string, according to identifications of said groups, to provide a consolidated character string; and
culling means, for selecting portions of said consolidated character string for inclusion in the second string and for converting said consolidated character string into said second string.

22. The apparatus of claim 21, further comprising a first dictionary of character groups that is used by said identifying means to identify character groups of the first character string.

23. The apparatus of claim 22, wherein every character group in the second character string is also in the first character string.

24. The apparatus of claim 22, wherein at least one character group in the second character string is not in the first character string.

25. Apparatus for transforming a long case name comprised of words, phrases, and punctuation into a short case name format, said apparatus comprising:

input means for providing the long case name; and a processor, including:
identifying means for providing an identification for character groups of said long case name;
consolidation means for applying a first set of rules to said long case name, according to identifications provided by said identifying means, to provide a consolidated case name;
culling means, responsive to said consolidation means, for applying a second set of rules to said consolidated case name to provide a culled case name; and
means for converting, through application of a third set of rules, the culled case name into the short case name format.

26. The apparatus of claim 25, further comprising a first dictionary of words that is used by said identifying means to analyze groups of characters in said long case name.

27. The apparatus of claim 26, further comprising a second dictionary of phrases which are used by said identifying means to detect phrases in said long case name.

28. The apparatus of claim 27, wherein every character group in the short case name is also in the long case name.

29. The apparatus of claim 27, wherein at least one character group in the short case name is not in the long case name.

30. A computerized short case name generator system which converts a first text string comprised of words to a second text string according to a set of rules, the system comprising:

input means for providing the first character string; and a processor, including:
identifying means for searching a dictionary for words contained in said first text string and for detecting words not found in said dictionary that are in said first text string;
parser means, responsive to said identifying means, for consolidating selected ones of words in said first text string and for eliminating selected other ones of words in said text string to create a consolidated text string;
culling means for selecting which words of said consolidated text string will be included in the second text string according to a first set of rules; and
formatting means for converting the selected words of said consolidated text string into words of the second text string.

31. The system of claim 30, further comprising:
a phrase dictionary containing phrases formed by groups of words wherein said identifying means detects selected groups of words which correspond to phrases in the phrase dictionary.

32. The system of claim 31, wherein said formatting means further includes means for converting a subset of words of said second text string to at least one of: corresponding abbreviations and acronyms according to a second set of rules.

33. The system of claim 32, wherein every word in the second text string is also in the first text string.

34. The system of claim 32, wherein at least one word in the second text string is not in the first text string.

35. Apparatus for transforming a first character string made up of character groups into a second character string, said apparatus comprising:

input means for providing said first character string; and a processor, including:
identifying means for providing an identification for each character group of said first character string;
first means for consolidating character groups of said first character string, according to identifications of said groups, and for selecting portions thereof for inclusion in the second string; and
second means, responsive to said first means, for providing said second character string.

36. The apparatus of claim 35, further comprising a first dictionary of character groups that is used by said identifying means to identify character groups of the first character string.

37. The apparatus of claim 36, wherein every character group in the second character string is also in the first character string.

38. The apparatus of claim 36, wherein at least one character group in the second character string is not in the first character string.

39. A method for using a processor to transform a first character string made up of character groups into a second character string, the method comprising the steps of:

the processor providing an identification for each character group of said first character string;

the processor consolidating character groups of said first character string, according to identifications of said groups, to provide a consolidated character string; and the processor selecting portions of said consolidated character string for inclusion in the second string and converting said consolidated character string into said second string.

40. The method of claim 39, wherein said identifying step uses a first dictionary of character groups to identify character groups of the first character string.

41. The method of claim 40, wherein every character group in the second character string is also in the first character string.

42. The method of claim 40, wherein at least one character group in the second character string is not in the first character string.

43. A method for using a processor to transform a long case name comprised of words, phrases, and punctuation into a short case name format, the method comprising the steps of:

the processor providing an identification for character groups of said long case name;

the processor applying a first set of rules to said long case name, according to said identifications of character groups, to provide a consolidated case name;

the processor applying a second set of rules to said consolidated case name to provide a culled case name; and the processor converting, through application of a third set of rules, the culled case name into the short case name format.

44. The method of claim 43, wherein a first dictionary of words is used to analyze groups of characters in said long case name.

45. The method of claim 44, wherein a second dictionary of phrases is used to detect phrases in said long case name.

46. The method of claim 45, wherein every character group in the short case name is also in the long case name.

47. The method of claim 45, wherein at least one character group in the short case name is not in the long case name.

48. A method using a computerized short case name generator system for converting a first text string comprised of words to a second text string according to a set of rules, the method comprising the steps of:

the system searching a dictionary for words contained in said first text string and for detecting words not found in said dictionary that are in said first text string;

the system consolidating selected ones of words in said first text string and eliminating selected other ones of words in said text string to create a consolidated text string;

the system selecting which words of said consolidated text string will be included in the second text string according to a first set of rules; and the system converting the selected words of said consolidated text string into words of the second text string.

49. The method of claim 48, further comprising the step of:

the system using a phrase dictionary containing phrases formed by groups of words to detect selected groups of words which correspond to phrases in the phrase dictionary.

50. The method of claim 49, further comprising the step of:

the system converting a subset of words of said second text string to at least one of: corresponding abbreviations and acronyms according to a second set of rules.

51. The method of claim 50, wherein every word in the second text string is also in the first text string.

52. The method of claim 50, wherein at least one word in the second text string is not in the first text string.

53. A method for using a processor to transform a first character string made up of character groups into a second character string, the method comprising the steps of:

the processor providing an identification for each character group of said first character string;

the processor consolidating character groups of said first character string, according to identifications of said groups, and selecting portions thereof for inclusion in the second string; and the processor providing said second character string from portions selected for inclusion therein.

54. The method of claim 53, further comprising the step of:

the processor using a first dictionary of character groups to identify character groups of the first character string.

55. The method of claim 54, wherein every character group in the second character string is also in the first character string.

56. The method of claim 54, wherein at least one character group in the second character string is not in the first character string.

* * * * *